United States Patent [19]

Tsuruta et al.

[11] Patent Number: 5,657,428
[45] Date of Patent: Aug. 12, 1997

[54] DYNAMIC INFORMATION PROCESSING SYSTEM AND METHOD FOR THE SAME

[75] Inventors: Setsuo Tsuruta, Machida; Yoshihito Ide, Fujisawa; Kenichi Ishii, Katsuta; Eiji Nishijima; Toshihiro Eguchi, both of Yokohama, all of Japan

[73] Assignee: Hitachi, Ltd., Tokyo, Japan

[21] Appl. No.: 213,267

[22] Filed: Mar. 15, 1994

[30] Foreign Application Priority Data

Mar. 17, 1993 [JP] Japan .................. 5-082575

[51] Int. Cl.$^6$ .................................. G06F 15/16
[52] U.S. Cl. .................. 395/11; 395/10; 395/54; 395/60
[58] Field of Search ............ 395/10–11, 50–51, 395/54, 60–61, 76

[56] References Cited

U.S. PATENT DOCUMENTS 5,299,287  3/1994  Tsuruta et al. ..
5,303,332  4/1994  Kirk et al. ............................ 395/60

FOREIGN PATENT DOCUMENTS 02-14323  1/1990  Japan .
2217069  10/1989  United Kingdom .

OTHER PUBLICATIONS

Sinha, Rahul, V.S. Rajput, and R.G.S. Asthana. "EXDAF-S–An Expert System for Dynamic Allocation of Facilities at Stations." Artificial Intelligence Applications 1991.

Stevens, W. Richard, "Advanced Programming in the Unix Environment." 1992.

*Primary Examiner*—Tariq R. Hafiz
*Attorney, Agent, or Firm*—Fay, Sharpe, Beall, Fagan, Minnich & McKee

[57] ABSTRACT

The present invention automatically generates a data block indicating the problem to be solved and the status to be aimed at which is called a goal by goal generating knowledge which is stored beforehand for a message given from the external or internal according to a situation change, dynamically generates and executes a plurality of goals in correspondence with the situation which changes with time by attaining the generated goal using goal attaining knowledge such as a goal strategy net and obtaining a solution, performs cooperation control consisting of at least one of partition, integration, and suspension of a goal, and realizes advanced intelligence for a system which corrects a schedule in real time.

50 Claims, 18 Drawing Sheets

FIG. 2(a)

| MESSAGE | GOAL |
|---|---|
| MESSAGE i | GOAL u |
|  |  |
|  |  |

| MESSAGE i1 | & | RECEIVED |
|---|---|---|
| MESSAGE i2 | & | NOT RECEIVED |
| MESSAGE i3 | BACKGROUND i | RECEIVED |
| ⋮ | ⋮ | ⋮ |

FIG. 2(c)

| BACKGROUND | GOAL |
|---|---|
| BACKGROUND i | GOAL u |
| BACKGROUND j | GOAL v |
| ⋮ | ⋮ |

FIG. 3(a)

| MESSAGE | CONDITION | SEPARATOR | GOAL |
|---|---|---|---|
| MESSAGE i | CONDITION a | . | GOAL u |
| MESSAGE i | CONDITION b | & | GOAL v |
| MESSAGE i | CONDITION c | . | GOAL v |
| MESSAGE i | CONDITION d | \|\| | GOAL w |
| MESSAGE i | CONDITION e | . | GOAL w |

FIG. 3(b)

| MESSAGE | GOAL | PRIORITY |
|---|---|---|
| MESSAGE i | GOAL u | 0.8 |
| MESSAGE i | GOAL v | 0.7 |
| MESSAGE i | GOAL w | 0.6 |
| ⋮ | ⋮ | ⋮ |

FIG. 4(a)

| MESSAGE | CONDITION 1 | CONDITION 2 | CONDITION 3 | GOAL |
|---|---|---|---|---|
| MESSAGE i | CONDITION a | CONDITION d | CONDITION f | GOAL u |
| MESSAGE i | CONDITION b | CONDITION e | — | GOAL v |
| MESSAGE i | CONDITION c | — | — | GOAL w |
| | | | | |

FIG. 4(b)

| MESSAGE | CONDITION 1 | CONDITION 2 | CONDITION 3 | GOAL |
|---|---|---|---|---|
| MESSAGE i | CONDITION a | CONDITION b | CONDITION c | GOAL u |
| | | | | GOAL v |
| | | | | GOAL w |
| | CONDITION d | CONDITION e | — | GOAL x |
| | | | | GOAL y |

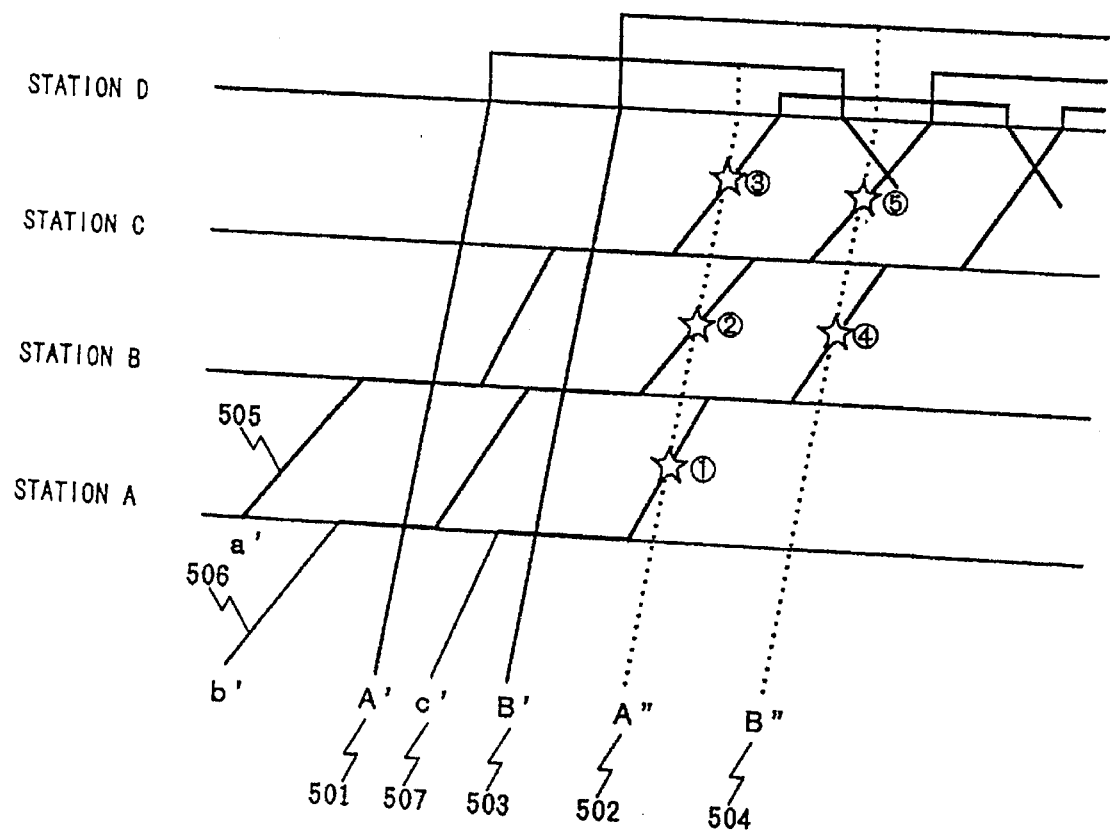

FIG. 6

| GOAL | EXECUTION METHOD |
|---|---|
| GOAL u | EXECUTION PROCEDURE r |
| GOAL v | EXECUTION PROCEDURE s |
| GOAL w | EXECUTION PROCEDURE t |
| ⋮ | ⋮ |

FIG. 10(a)

| | | |
|---|---|---|
| 1001 → | CLASS | :GOAL GENERATION STRATEGY |
| 1002 → | MESSAGE | :AUTOMATIC JUDGE REQUEST |
| 1003 → | CURRENT GOAL | :GOAL S |
| 1004 → | CONDITION | :{CONDITION K, CONDITION L} |
| 1005 → | UPPER GOAL | :GOAL R |
| 1006 → | STRATEGY NAME | :STRATEGY Z |

FIG. 10(b)

| | | |
|---|---|---|
| 1011 → | CALSS | :PERSONIFIED UNIT |
| 1012 → | OBJECT | :TRAIN A |
| 1013 → | BELONGING | :LINE-W |
| 1014 → | DELAY | :MODERATE |
| 1015 → | UPPER GOAL | :GOAL R |
| 1016 → | NAME | :DELAY |

FIG. 10(c)

| | | |
|---|---|---|
| 1021 → | CLASS | :MESSAGE |
| 1022 → | ID | :MESSAGE M |
| 1023 → | SENDER | :ACTUAL RUN MONITORING UNIT |
| 1024 → | DESTINATION | :REGULATION JUDGEMENT UNIT |
| 1025 → | CONTENT | :AUTOMATIC JUDGE REQUEST |
| 1026 → | DELAYED TRAIN | :EXPRESS TRAIN A |
| 1027 → | DELAYED TIME | :20 |

FIG. 10(d)

| | | |
|---|---|---|
| 1031 → | CLASS | :CONDITION |
| 1032 → | ID | :CONDITION K |
| 1033 → | CONTENT | :{DELAY, MODERATE} |

FIG. 10(e)

| | | |
|---|---|---|
| 1041 → | CLASS | :CONDITION |
| 1042 → | ID | :CONDITION L |
| 1043 → | CONTENT | :{BELONGING, LINE-W} |

| CONDITION | GOAL |
|---|---|
| DELAY OF THE LAST TRAIN | SECURE THE LAST TRAIN OF EACH DESTINATION |
| EARLY MORNING | ......... |
| ⋮ | ⋮ |
| DEFAULT | PUNCTUAL DEPARTURE FROM TOKYO STATION |

FIG. 16(a)

```
1601
1602  — CLASS                    :GOAL
1603  — NAME                     :PUNCTUAL DEPARTURE FROM TOKYO
1604  — LEVEL                    :1
1605  — TYPE                     :CLONING TYPE (FORK TYPE)
        CLONE NUMBER             :3
1606    (NUMBER OF CHILDREN)
      — APPLICABLE STRATEGY      :{DEPARTURE PLATFORM FIXING STRATEGY,
                                    SHEDDED VEHICLE USING STRATEGY,
1607                                TRAIN CANCELLING STRATEGY}
1608  — CURRENT PROBLEM          :SHORTAGE OF TIME FOR CHANGING DIRECTION
1609  — CURRENT STATION          :TOKYO
1610  — EXECUTION STATUS         :SUSPENDING
      — CURRENT TRAIN            :2040A
```

FIG. 16(b)

```
1611
1612  — CLASS                    :STRATEGY
1613  — NAME                     :DEPARTURE PLATFORM FIXING STRATEGY
1614  — APPLICABLE GOAL          :{PUNCTUAL DEPARTURE FROM TOKYO}
1615  — APPLICABLE SITUATION     :LESS THAN 30 MINUTES BEFORE DEPARTURE
        CLONE NUMBER             :2
1616    (NUMBER OF CHILDREN)
      — SUB-GOALS                :{SEARCH A VEHICLE NOT YET LEAVING FROM
                                    THE SAME PLATFORM, DISPATCH ALTERATION}
1617  — TYPE                     :DECOMPOSITION TYPE (SUBGOAL TYPE)
1618  — GENERATION GOAL          :{ }
1619  — GENERATION MEANS         :GOAL GENERATING MEANS K
1620  — ALTERNATIVE MEANS        :{ALTERNATIVE PROCEDURE 1,
                                    ALTERNATIVE PROCEDURE 2}
1621  — ADJUSTMENT MEANS         :{MAIN ADJUSTMENT PROCEDURE,
                                    ALTERNATIVE ADJUSTMENT PROCEDURE 1,
1622                                ALTERNATIVE ADJUSTMENT PROCEDURE 2}
1624  — CONTINUATION CONDITION   :{REPETITION NUMBER, 7}
1623  — EXECUTION ORDER          :ARRIVAL ORDER
      — PRIORITY                 :70
```

FIG. 17

| | | |
|---|---|---|
| 1701 | CLASS | :GOAL AND STRATEGY JOINT STRATEGY |
| 1702 | NAME | :DEPARTURE PLATFORM FIXING STRATEGY |
| 1703 | GOAL NAME | :PUNCTUAL DEPARTURE FROM TOKYO |
| 1704 | APPLICABLE GOAL | :{PUNCTUAL DEPARTURE FROM TOKYO} |
| 1705 | APPLICABLE SITUATION | :LESS THAN 30 MINUTES BEFORE DEPARTURE |
| 1706 | CLONE NUMBER (NUMBER OF CHILDREN) | :2 |
| 1707 | SUB-GOALS | :{SEARCH A VEHICLE NOT YET LEAVING FROM THE SAME PLATFORM, DISPATCH ALTERATION} |
| 1708 | TYPE | :DECOMPOSITION TYPE (SUBGOAL TYPE) |
| 1709 | GENERATION GOAL | :{ } |
| 1710 | GENERATION MEANS | :GOAL GENERATING MEANS K |
| 1711 | ALTERNATIVE MEANS | :{ALTERNATIVE PROCEDURE 1, ALTERNATIVE PROCEDURE 2} |
| 1712 | ADJUSTMENT MEANS | :{MAIN ADJUSTMENT PROCEDURE, ALTERNATIVE ADJUSTMENT PROCEDURE 1, ALTERNATIVE ADJUSTMENT PROCEDURE 2} |
| 1713 | CONTINUATION CONDITION | :{REPETITION NUMBER, 7} |
| 1714 | PRIORITY | :70 |

FIG. 18

```
1801
1802 ─── CLASS           : PERSONIFIED UNIT
1803 ─── NAME            : TRAIN DISPATCHER
1804 ─── STATUS          : EXECUTING
1805 ─── SITUATION       : ORDINARY
     ─── CURRENT GOAL    : SEARCH A VEHICLE STARTABLE
1806                        FROM THE SAME PLATFORM
1808 ─── UPPER GOAL      : PUNCTUAL DEPARTURE FROM TOKYO
1807 ─── CURRENT STRATEGY: FORWARD SEARCH STRATEGY
     ─── CANDIDATE STRATEGY : {FROWARD SEARCH STRATEGY,
1809                            REVERSE SEARCH STRATEGY}
1810 ─── CURRENT PROBLEM : SHORTAGE OF TIME FOR CHANGING DIRECTION
1811 ─── CURRENT TRAIN   : TOKYO
1812 ─── OBJECT          : 2040A
1813 ─── BELONGING       : T-LINE
     ─── DELAY           : 20
                .
                .
                .
1814 ─── #C PROCEDURE
1815 ─── PROCEDURE A () {…}
     ─── PROCEDURE B () {…}
                .
                .
                .
```

DYNAMIC INFORMATION PROCESSING SYSTEM AND METHOD FOR THE SAME

BACKGROUND OF THE INVENTION

1. Field of the Invention

The present invention relates to a dynamic information processing system and a method therefor and more particularly to a knowledge information processing art (artificial intelligence art) which is suited to scheduling or rescheduling on a scene where the situation changes dynamically. The present invention is applied, for example, to scheduling or rescheduling for preparing or changing a train schedule or trainman schedule or for operating elevator maintenance engineers.

2. Description of the Prior Art

As an art for inferring by using a so-called knowledge base, there has been an art indicated in U.S. Pat. No. 4,648,044 (Basic expert system tool, Technoledge, Ltd., Steven Hardy, Mar. 3, 1987).

This is an art for describing knowledge according to rules and inferring using it. However, since a basic procedure for attaining a goal, an adjustment means of adjusting a trouble thereof, and an integration means for them are all described as rules, they exist together. Therefore, when problems become complex, the number of rules to be executed becomes enormous, and the processing speed rapidly decreases as the number of rules increases, and the rules are not intertwined with each other, and the reliability reduces.

On the other hand, an information processing system for goal and strategy type cooperation inference knowledge processing is described in U.S. Pat. No. 5,299,287. This is an expert system which is suited to planning or scheduling of large-scale complex plans such as preparation of train schedules.

This system is provided with a multi-hierarchy network for goal and strategy which is called a goal strategy net. The goal indicates a data block or frame representing a problem to be solved or a status to be aimed at. Hereinafter, the frame, data frame, and object are all called a frame. The strategy indicates a data block or frame representing a policy and means for attaining the goal (goal attaining method and means). The goal and strategy constitutes a multi-hierarchy network. The strategy includes a strategy in which procedures and rules for attaining a goal actually are described and also a strategy for recursively partitioning and executing a goal to sub-goals or integrating the sub-goals.

The inference unit infers using such a goal strategy net. For example, to prepare a train schedule, a goal of most significant "preparation of train schedule" is activated. Then, the inference unit partitions and executes the goal using the goal strategy net and obtains a solution by connecting, adjusting, and integrating obtained partial solutions. A goal and strategy oriented cooperation inference method for representing knowledge for partitioning a complex and large scale problem and connecting, adjusting, and integrating obtained partial solutions as mentioned above as a goal-strategy net and for inferring using it is known.

According the aforementioned information processing system described in U.S. Pat. No. 5,299,287, the knowledge is represented by the goal strategy net, so that there are not the aforementioned problems in the art in U.S. Pat. No. 4,648,044. Namely, since the knowledge is hierarchized, there is not a problem imposed that intertwisting between the rules cannot be seen and the reliability as a knowledge base system is improved. Flexible and fast inference is also available.

Such a goal and strategy oriented cooperation inference method is useful in solving static problems. However, this method is an art for incorporating one of the most significant goals to be attained by a system at the time of generation of the system and for solving it. Namely, a problem which can be interpreted is determined and fixed when the system is generated and the number of such problems is only one. Therefore, when various statuses are changed in real time and a plurality of problems to be solved are generated successively, the above method cannot solve them easily.

For example, the above method is suited to preparation of a train schedule every year or season. However, when a train schedule is actually applied, various status changes such as train delays due to vehicle breakdowns or rain or snow falls in real time and a plurality of problems (goals) are caused successively. The aforementioned method cannot be used so as to solve problems which are caused dynamically like this.

SUMMARY OF THE INVENTION

An object of the present invention is to provide a dynamic information processing system for dynamically generating and processing goals corresponding to internal and external messages in the situation which is changed in real time and a method therefor and furthermore to provide a representation method for recognition models for dynamic problem solution.

To accomplish this object, the present invention is a dynamic information processing system and method including a processor, storage means, and input means, has goal generating knowledge which stores a method for generating a goal from a message in the aforementioned storage means and goal attaining knowledge which stores a method for attaining a goal according to the goal in the aforementioned storage means, generates a goal including at least one of the problem to be solved and the status to be aimed at on the basis of a message inputted from the aforementioned input means as a data block from the aforementioned goal generating knowledge, and attains the above goal for the data block indicating the above generated goal from the aforementioned goal attaining knowledge. Furthermore, the present invention stores goal attaining knowledge which stores a method for attaining a goal according to the goal for a message in the aforementioned storage means and goal generating knowledge which is stored in the aforementioned storage means as a goal strategy net consisting of a goal and a strategy data block indicating a goal attaining method, wherein the above goal data block includes at least one goal among the problem to be solved and the status to be aimed at, infers the goal using the aforementioned goal strategy net on the basis of the message inputted from the aforementioned input means, generates a goal data block on the basis of the above inferred result, and attains the goal represented by the above goal data block from the aforementioned goal attaining knowledge on the basis of the above generated goal data block.

In other words, to accomplish the aforementioned object, the present invention automatically generates a goal for a message given from the external or internal according to a situation change. For that purpose, a data block or frame (called "goal generating knowledge") indicating the correspondence between a message and a goal which is generated thereby is installed in the system.

A goal and strategy joint strategy in which a goal and strategy are merged is provided so as to enhance the efficiency of knowledge incorporation or processing. As a knowledge representation method, a means of unifying a goal execution control strategy and a goal generation strategy as a goal strategy net is presented and the description ability for a recognition model is enhanced remarkably by goal strategy orientation.

Therefore, the present invention performs the following function and operation.

In fields of scheduling, planning, and changing in the state that the train traffic regulation is changed in real time and of direction and control (decision making accompanying public serviceability and great social responsibility), high reliability in processing in real time including critical response is required. Furthermore, for example, a new goal to be attained is generated due to a train delay or the number of new goals is increased or decreased depending on the status or with time.

According to the present invention, when the system receives a message (a message may be received not only from another computer or system but also from another process by interprocess communication or a message outputted from knowledge for goal attainment, that is, from the own process may be received), it generates a goal using the aforementioned goal generating knowledge. The system recursively partitions the generated goal into sub-goals, for example, by using the goal strategy net, attains them by simplifying them to partial problems, and adjusts and integrates them to obtain a solution.

When the system receives a plurality of messages, it generates corresponding goals and saves them in the goal queue after the system ends or suspends the executing goal. When the system receives an emergency goal execution instruction message, it suspends the executing goal, executes the emergency goal, and restarts the suspended goal after the execution is finished so as to allow processing in real time.

It is possible to generate sub-goals depending on the contents of the goal generating knowledge and to directly execute them or furthermore partition and attain them into sub-goals. By doing this, interactive goal-oriented partial automatic processing is available.

The foregoing and other objects, advantages, manner of operation and novel features of the present invention will be understood from the following detailed description when read in connection with the accompanying drawings.

BRIEF DESCRIPTION OF THE DRAWINGS

FIGS. 2(a) to 2(c) show examples (No. 1) of goal generating knowledge.

FIGS. 3(a) and 3(b) show examples (No. 2) of goal generating knowledge.

FIGS. 4(a) and 4(b) show examples (No. 3) of goal generating knowledge.

FIG. 5 is a drawing showing a shunting problem (difficulty mark) caused by a train delay.

FIG. 6 shows an example (No. 1) of goal attaining knowledge.

FIGS. 10(a) to 10(e) show examples of goal generating knowledge using a frame.

FIGS. 16(a) and 16(b) show examples of a goal frame and strategy frame.

FIG. 17 shows an example of a goal and strategy joint strategy frame.

FIG. 18 shows an example of a personified unit frame.

DETAILED DESCRIPTION OF THE PREFERRED EMBODIMENTS

[EMBODIMENT 1]

Figure 1:
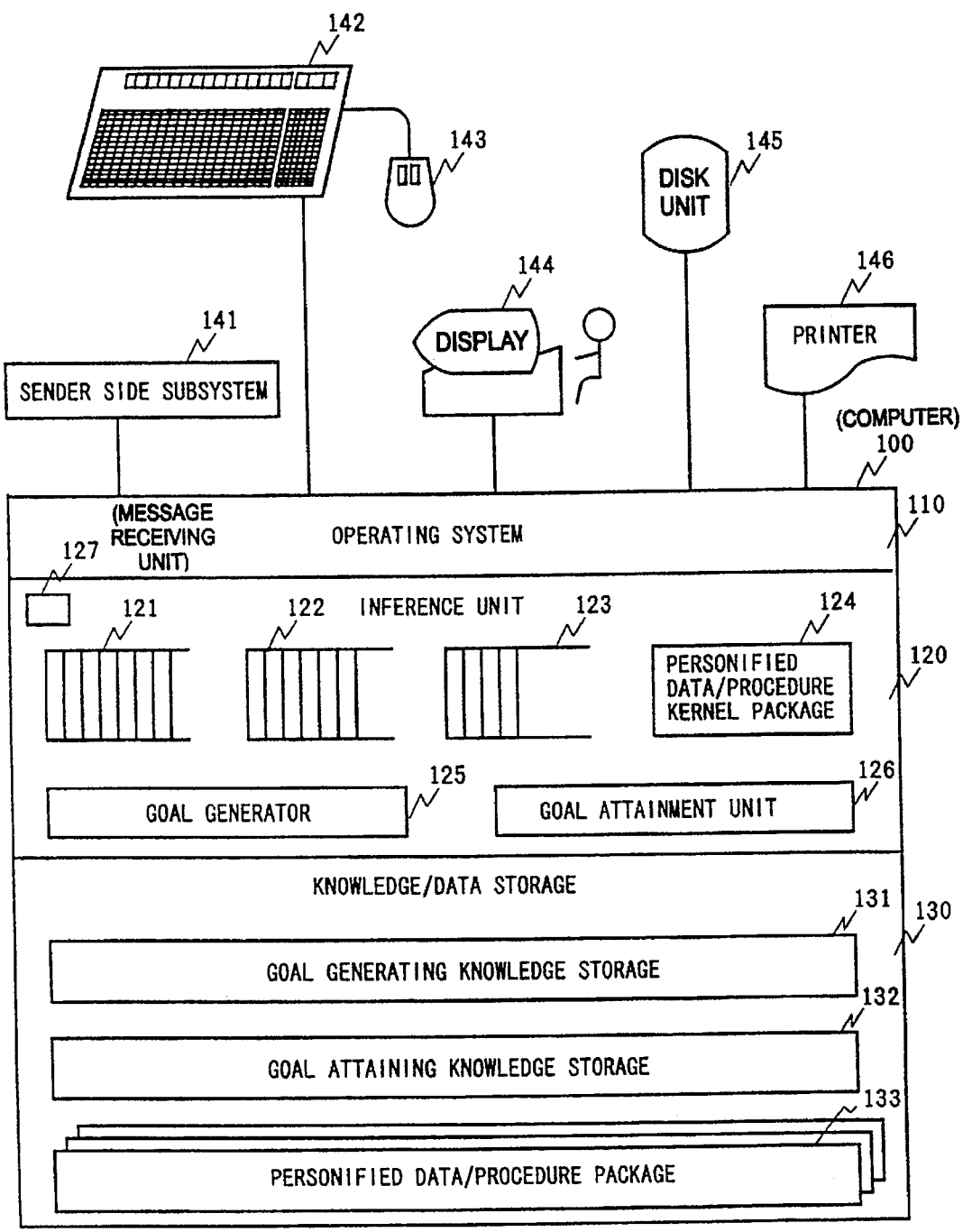
FIG. 1 is an entire block diagram of a dynamic information system relating to the present invention.

FIG. 1 is an entire block diagram of a dynamic information system relating to the first embodiment of the present invention. This system is an embodiment that the present invention is applied to train traffic management.

The system consists of a computer 100, a sender side subsystem 141, a keyboard 142, a mouse 143, a display 144, a disk unit 145, and a printer 146. The computer 100 is a general-purpose computer and consists of an operating system 110, an inference unit 120, and a knowledge/data storage 130 which support operation of the computer.

The inference unit 120 executes inference for solving a problem. The inference unit 120 consists of a message receiving unit 127, a goal generator 125 for generating a goal for a message received from the message receiving unit 127, and a goal attainment unit 126 for attaining the generated goal. The goal which is generated here is a goal which is dynamically generated for the received message and is different from a goal which is generated by partitioning into sub-goals in a conventional system. It is assumed that the goal which is generated dynamically for the received message is called a time variant goal. The inference unit 120 consists of a message queue 121, a generated goal storage (goal queue) 122, a suspending goal queue 123, and a personified data/procedure kernel package 124.

The message queue 121 is a storage area for storing a received message temporarily. The generated goal storage 122 is a storage area for storing a generated goal temporarily. The suspending goal queue 123 is a storage area for storing the goal for which suspension of the execution is requested temporarily. The personified data/procedure kernel package 124 will be explained in detail in a liter embodiment.

The knowledge/data storage 130 is a storage of knowledge or data for representing it. The knowledge/data storage 130 consists of a goal generating knowledge storage 131 in which knowledge for generating a goal from a message is stored, a goal attaining knowledge storage 132 in which knowledge for attaining a goal (goal partitioning necessary for attainment is included) is stored, and a personified data/procedure package 133. The personified data/procedure package 133 will be explained in detail in a later embodiment.

The sender side subsystem 141 collects train traffic data and issues a message of, for example, "train delay" in real time. A message received by the computer 100 is stored in the message queue 121 by the inference unit 120. A message is inputted from the keyboard 142 or the mouse 143 or may be generated on the basis of data which is inputted by the keyboard and mouse. A message may be sent from another process or program or may be generated when the goal attainment unit 126 attains a goal. Those messages generated in the computer 100 are also stored in the message queue 121 by the inference unit 120.

The goal generator 125 of the inference unit 120 generates a goal from a message stored in the message queue 121 using the goal generating knowledge stored in the goal generating knowledge storage 131 of the knowledge/data storage 130. For example, when there is a message of "train delay", the goal generator 125 generates a-goal of "delay recovery" in correspondence with it. The generated goal is stored in the generated goal storage 122. The goal generating knowledge of the goal generating knowledge storage 131 will be described later with reference to FIGS. 2 to 5.

Next, the goal attainment unit 126 attains the goal stored in the generated goal storage 122. To attain the goal, the goal attaining knowledge stored in the goal attaining knowledge storage 132 is used. The goal attaining knowledge will be described later with reference to FIG. 6.

Finally, the problem resolution result (for example, a schedule for delay recovery, that is, a train traffic regulation schedule) is displayed on the display 144 and outputted to the printer 146 when necessary.

The disk unit 145 is used as an auxiliary storage for storing a large amount of memory or the goal generating knowledge or goal attaining knowledge.

Next, the goal generating knowledge stored in the goal generating knowledge storage 131 of the knowledge/data storage 130 will be explained with reference to FIGS. 2 to 4.

FIG. 2(a) shows a most basic embodiment of the goal generating knowledge. Namely, the memory structure for representing a table in which a goal to be generated corresponds to an inputted message is shown. In the example shown in this drawing, when a message i (201) is inputted, a goal u (202) is generated.

FIG. 2(b) shows a correspondence table for deriving a corresponding background, situation, state, circumstance (hereinafter, unified to a background), or motive by making a plurality of combinations of several messages and FIG. 2(c) shows a correspondence table for deriving a goal from the background or motive.

In FIG. 2(b), in the left column (message column), messages such as message i1, message i2, message i3, etc. are lined up. "&" shown in the central column indicates that the current message is linked to the next message. "Background i" indicates the derived background.

The example shown in this drawing indicates that when a message i1 is received, and a message i2 is received, and a message i3 is received, a background i is realized. "Received" in the right column indicates that the current message is already received and "Not received" indicates that the current message is not received. In the example shown in this drawing, the message i1 and the message i3 are received, though the message i2 is not received. "Motive" may be used in correspondence with them instead of "Background".

When the background (or motive) is realized, the goal corresponding to the background (or motive) is generated in FIG. 2(c). In the example shown in this drawing, when the background i is realized, the goal u is generated and when the background j is realized, the goal v is generated.

As mentioned above, a background or motive may be derived by combining several messages so as to generate a goal corresponding to the background or motive.

FIG. 3(a) shows an example of goal generating knowledge for generating various goals when the predetermined conditions are satisfied for the message i. The first row indicates that when the condition a is satisfied for the message i, the goal u is generated. A symbol "." in the classification column indicates that the condition is not continued to the next row.

The second and third rows indicate that when the condition b is satisfied and the condition c is also satisfied for the message i, a goal v is generated. The fourth and fifth rows indicate that when the condition d or e is satisfied for the message i, a goal w is generated. A symbol "||" in the classification column indicates that the condition in the next row is continued via "or".

When the classification is other than ".", the goal name may be omitted. A condition may be set separately from a message and when a message is sent, the corresponding condition may be sent together with the message to the computer. It is possible to set "Background or Motive" in the column of "Message" shown in FIG. 3(a), to generate a background or motive corresponding to the message, for example, as explained in FIG. 2(b), and to generate a goal corresponding to the background or motive. Furthermore, the message may vary with the condition. For example, the third row shown in FIG. 3(a) may be a message j, the fourth row a message k, and the fifth row a message h.

FIG. 3(b) shows an example of goal generating knowledge which can generate a plurality of goals for a message at the same time. Three goals u, v, and w correspond to the message i. Therefore, when the message i is received, these three goals are generated. For example, when a message that a car does not start is inputted, a plurality of goals such as "Check for expiration of battery life", "Check for start system trouble", and "Check for fuel system fault" are generated.

Furthermore in the example shown in FIG. 3(b), priorities are assigned in correspondence with the goals to be generated. The priority indicates a priority for attaining the goal and the goals are attained in the order of descending properties. For example, in the aforementioned example, when a car does not start, a priority is assigned to each goal in the descending order of efficiency in fault check by an engineer or in the ascending order of check time.

FIG. 4(a) shows an example of goal generating knowledge for generating a goal when several conditions are satisfied for a message. In this drawing, when conditions a, d, and f are satisfied for a message i, a goal u is generated. When conditions b and e are satisfied for the message i, a goal v is generated. Furthermore, when a condition c is satisfied for the message i, a goal w is generated.

By using goal generating knowledge having a structure as shown in FIGS. 3 or 4, for example, when a "train delay occurrence message" is sent from a train traffic system, different goals may be generated by combining a plurality of conditions such as train type, location, and time zone. For example, when the delayed train is an "express train", and the location is "between station A and station B", and the time zone is "after 7:30 a.m." and these conditions are satisfied, a goal of "avoid shunting problem after station B" is generated.

FIG. 4(b) shows an example of goal generating knowledge for generating a plurality of goals when several conditions are satisfied for a message. In this drawing, when conditions a, b, and c are satisfied for a message i, goals u, v, and w are generated. When conditions d and e are satisfied for the message i, goals x and y are generated.

Goal generating knowledge is not limited to those shown in FIGS. 2 to 4. By combining the structures explained in FIGS. 2 to 4, a goal may be generated in a more complicated status. For example, a table that messages which are combined with various conditions as shown in FIGS. 3(a), 4(a), and 4(b) correspond to backgrounds or motives is prepared and a goal may be generated by using the table and the correspondence table shown in FIG. 2(c). It is also possible to allow a plurality of different messages and a plurality of different conditions which are combined to directly correspond to a plurality of goals as shown in FIGS. 3 and 4(b) or to allow these combinations to correspond to the background or motive first and to allow at least one goal to correspond to a combination of a plurality of backgrounds or motives and a plurality of messages and conditions.

FIG. 5 shows an example of a train schedule. An example that goal generating knowledge in the form shown in FIG. 4(b) is applied to a train schedule adjustment system will be explained with reference to FIG. 5.

In FIG. 5, it is assumed that the traffic schedule of a train A is a line A' 501, and the expected traffic schedule thereof in case of delay is a line A" 502, and the traffic schedule of a train B is a line B' 503, and the expected traffic schedule thereof in case of delay is a line B" 504, and the traffic schedule of a train a is a line a' 505, and the traffic schedule of a train b is a line b' 506, and the traffic schedule of a train c is a line c' 507. The trains A and B are express trains and the trains a, b, and c are local trains.

In the goal generating knowledge shown in FIG. 4(b), it is assumed that the "message i" is an "express train A delay message", and the "condition a" is "passing local train a", and the "condition b" is "passing local train b", and the "goal u" is "avoid shunting problem of line A" at station A", and the "goal v" is "avoid shunting problem of line A" at station B", and the "goal w" is "avoid shunting problem of line A" at station C".

For example, it is assumed that the express train A is delayed and the line A' 501 is changed to the line A" 502. If this occurs, the "express train A delay message" (message i) is generated. Since there are three conditions such as "passing local train a" (condition a), "passing local train b" (condition b), and "passing local train c" (condition c), shunting problems shown by asterisks ① to ③ are caused and a plurality of goals such as "avoid shunting problem of line A" at station A" (goal u), "avoid shunting problem of line A" at station B" (goal v), and "avoid shunting problem of line A" at station C" (goal w) are generated.

Furthermore, due to the delay of the line A', the line B' 503 is also changed like the line B" 504 by the effect of the delay of the train A and shunting problems shown by asterisks ④ and ⑤ are caused. If there are conditions such as "passing local train b" and "passing local train c" in this case, goals such as "avoid shunting problem of line B" at station B" and "avoid shunting problem of line B" at station C" are generated.

For that purpose, it is desirable to prepare, for example, goal generating knowledge having the structure shown in FIG. 4(b) so that goals such as "avoid shunting problem of line B" at station B" and "avoid shunting problem of line B" at station C" are generated under the condition of "train B passing local train b" and "train B passing local train c" for the "express train A delay message". Or, an "express train B delay message" may be issued so as to generate these goals for the message.

When the delay time of the line A' is prolonged furthermore, a goal such as "avoid change direction problem" (805, FIG. 8) or "avoid car exit and entrance collision" (806) may be generated.

Next, the goal attaining knowledge stored in the goal attaining knowledge storage 132 of the knowledge/data storage 130 will be explained with reference to FIG. 6.

FIG. 6 shows a most basic embodiment of goal attaining knowledge. For the generated goals, the attaining methods are described. It is described, for example, that it is necessary to execute an execution procedure r so as to attain a goal u, to execute an execution procedure s so as to attain a goal v, and to execute an execution procedure t so as to attain a goal w.

Figure 7:
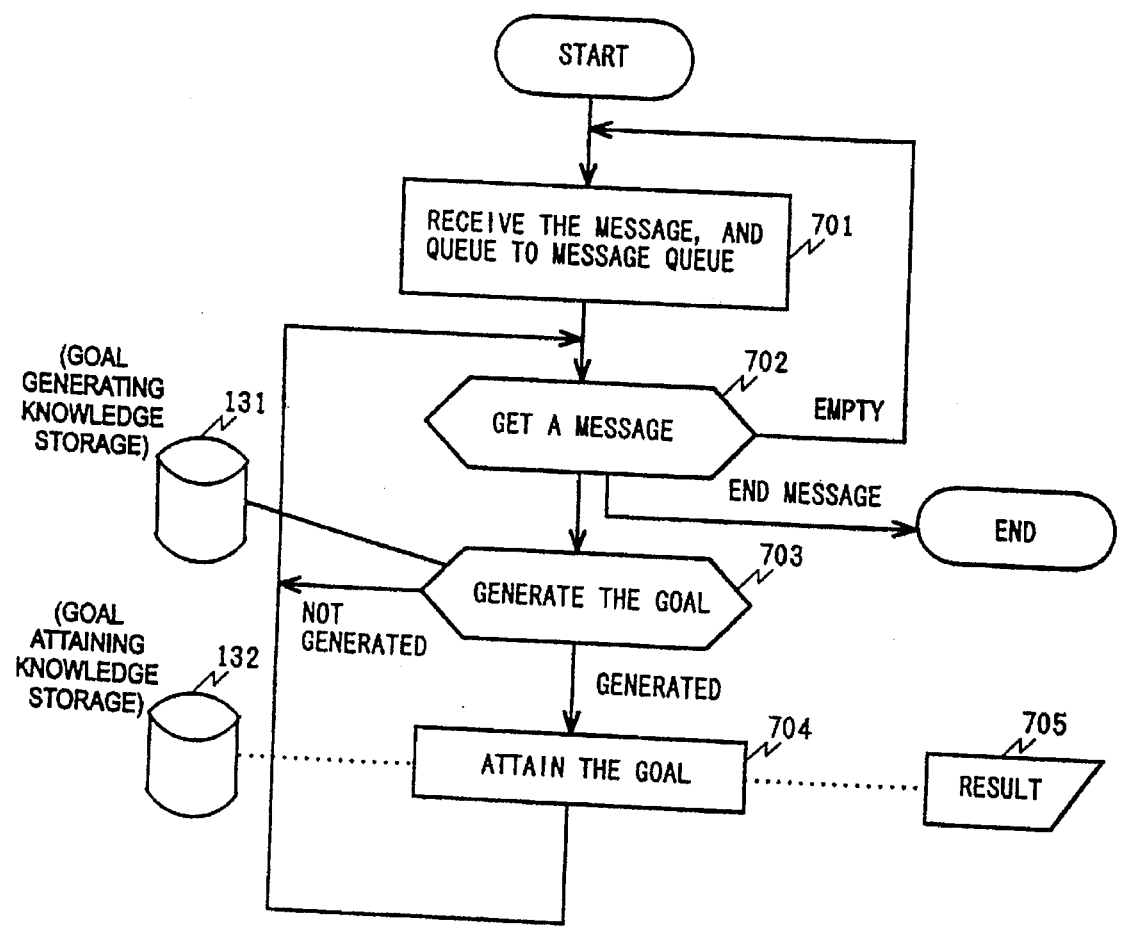
FIG. 7 is a flow chart (No. 1) of time variant goal knowledge processing.

FIG. 7 is a flow chart showing the processing procedure for generating and attaining a goal in the system shown in FIG. 1. The processing procedure will be explained hereunder on the assumption that goal generating knowledge in the form shown in FIG. 2(a) and goal attaining knowledge in the form shown in FIG. 6 are used.

The system of this embodiment receives a message (for example, information which varies with time such as train information) in a block 701 first and puts it to a message queue 121. Next, the system gets a message from the message queue 121 in a block 702.

In a block 703, the system compares the gotten message with the message part of the goal generating knowledge of the goal generating knowledge storage 131. The message part of the goal generating knowledge is the part (for example, 201) shown in FIG. 2(a) where the message name is recorded. When a match is found as a result of comparison, the system gets the corresponding goal (for example, 202) and goes to a block 704. The goal which is gotten here is a generated goal and the generated goal is stored in the generated goal storage 122.

If there is not a goal corresponding to the message in the block 703, the system does not generate a goal and returns to the block 702 so as to get the next message. When there is not a matched message, a goal may be generated by default. In this case, the system generates a default goal and goes to the block 704.

In the block 704, the system attains the generated goal using the goal attaining knowledge of the goal attaining knowledge storage 132. Namely, the system reads and executes the execution procedure corresponding to the generated goal. The goal attaining method contains a procedure for partitioning and integrating a goal to sub-goals. In such a case, the system partitions the goal to sub-goals according to the structure when necessary, simplifies the goal to sub-goals so as to attain and integrate them, and outputs a goal attained result 705.

When the goal is attained, the system returns to the block 702, gets the next message, and generates and executes a goal repeatedly. When there is no message to be gotten in the block 702, the system returns to the block 701 so as to receive the next message. When there is no received message in the block 702, the system may return control to the operating system 110 so as to wait for a message. When the message which is gotten in the block 702 is a system end message, the goal generating and attaining processing in the system ends.

In the aforementioned example, goal generating knowledge in the form shown in FIG. 2(a) is used. However, the goal generating knowledge shown in FIGS. 2(b) to 4(b) may be used.

However, when goal generating knowledge in the form shown in FIGS. 2(b) and 2(c) is to be used, the system compares a message which is received in the block 701 with the correspondence table shown in FIG. 2(b). When a match is found, the system generates a motive or background and puts the motive or background to the message queue 121. To confirm whether messages which are combined are all received, the system sets "received" in the storage area (FIG. 2(b)) of received/not received corresponding to the received messages. Hereafter, the system handles motives or backgrounds in the same way as messages.

When goal generating knowledge in the form shown in FIG. 3(a) is to be used, to compare a message which is gotten in the block 703 with the message part of the goal generating knowledge, the system checks conditions (for example, conditions a and b shown in FIG. 3(a)) furthermore and when the predetermined conditions are satisfied, the system generates the corresponding goals.

When goal generating knowledge in the form shown in FIG. 3(b) is to be used, the system gets a plurality of goals when generating goals in the block 703 and orders them (generally structuring). The ordering indicates that these plurality of goals are gotten and stored in the generated goal storage 122 in the order of descending priorities.

When goal generating knowledge in the form shown in FIG. 4(a) is to be used, the system checks each condition (for example, conditions a and d shown in FIG. 4(a)) and gets goals which also satisfy these conditions when goals are generated in the block 703. The same may be said with a case that goal generating knowledge in the form shown in FIG. 4(b) is to be used.

[EMBODIMENT 2]

Next, the second embodiment of the present invention will be explained. The second embodiment has the system structure shown in FIG. 1 in the same way as with the first embodiment mentioned above and uses the goal generating knowledge shown in FIGS. 2 to 4. Therefore, the explanation of them will be omitted. According to the second embodiment, the goal attaining knowledge is stored as a goal strategy net. The goal strategy net consists of a goal and a strategy which is a goal attaining method, which are stored in the network form.

Figure 8:
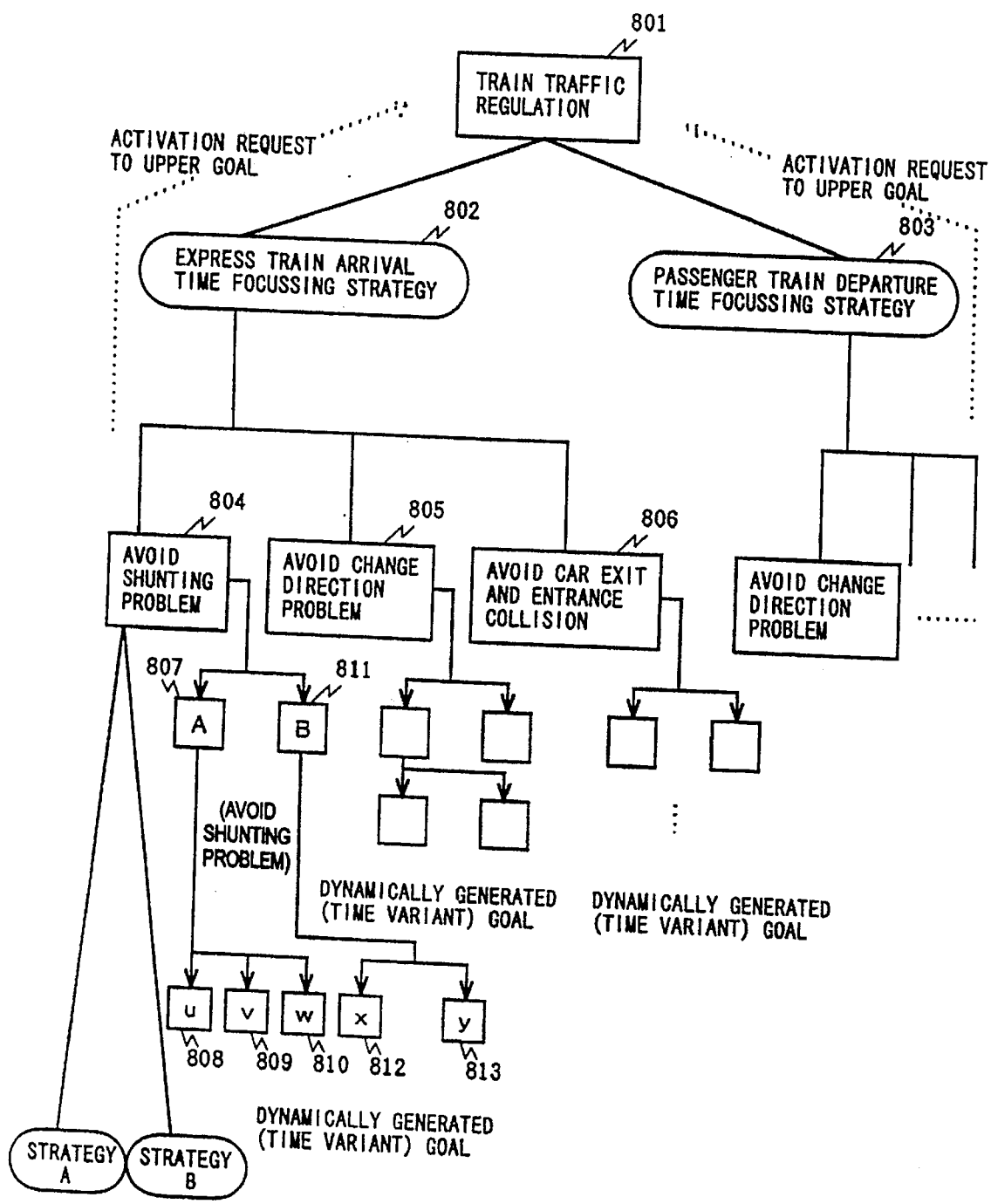
FIG. 8 shows an example of a goal strategy net for executing train traffic regulation.

FIG. 8 shows an example of a goal strategy net for attaining a goal of recovery (called train traffic regulation) of traffic irregularity of a moving article (particularly a train). A "train traffic regulation" 801 is a most significant goal. As strategies for accomplishing this goal 801, there are two strategies available, such as "express train arrival time focusing strategy" 802 and "passenger train departure time focusing strategy" 803.

"Avoid shunting problem" 804, "avoid change direction problem" 805, and "avoid car exit and entrance collision" 806 are sub-goals of the goal 801 in the strategy 802. These goals and strategies are incorporated in the goal attaining knowledge storage 132 of the computer 100 as goal attaining knowledge beforehand.

According to the second embodiment, a goal is generated from a received message using the goal generating knowledge in the same way as with the first embodiment mentioned above. In this case, for example, since this embodiment is provided with the goal strategy net, when a goal is generated in the block 703 shown in FIG. 7, a goal (data block or frame) which is incorporated in the goal strategy net beforehand may be used as it is. In this case, since a plurality of goals in which only concrete values are different cannot be processed at the same time, the processing function (function of parallel processing and inter-goal competitive processing) is low, though the memory load is small.

On the other hand, it is possible to copy a goal (frame or data block) which is incorporated already as a goal strategy net and to generate a goal by setting an attribute to the copy. For example, in the aforementioned example shown in FIG. 5, a goal such as "avoid shunting problem of line A" at station A" is newly generated for the express train A delay message. In this case, however, a goal which is incorporated already as a goal strategy net may be copied and used without being used as it is.

Namely, if the goal strategy net shown in FIG. 8 exists, by copying "avoid shunting problem" 804 which is incorporated in the goal strategy net already and changing the attribute thereof, a goal of "avoid shunting problem of line A"" 807 is generated and goals of "avoid shunting problem of line A" at station A" (goal u) 808, "avoid shunting problem of line A" at station B" (goal v) 809, and "avoid shunting problem of line A" at station C" (goal w) 810 are also generated.

By copying "avoid shunting problem" 804 which is incorporated already and changing the attribute thereof also for the train B, goals of "avoid shunting problem of line B"" 811, "avoid shunting problem of line B" at station B" 812, and "avoid shunting problem of line B" at station C" 813 are generated. When these goals are developed and attained, the strategy may be copied when necessary.

When the goal 804 is copied and the time variant goals 807 to 813 are dynamically generated in the goal strategy net shown in FIG. 8, an activation request may be issued to the goal 801 which is an upper goal thereof automatically or by an instruction of a user. By doing this, the goal 801 is activated or a copy of the goal 801 is generated as a new goal.

By doing this, for example, when the goal 801 cannot be attained even if the goal 804 can be attained, it is possible to execute another strategy (for example, strategy B) of the goal 804 and to change the attainment strategies of the goals 805 and 806 when necessary automatically or on an interactive basis of a user. Namely, the upper goal 801 can be attained by harmonious attainment of the sub-goals, that is, cooperation among goals or subgoals. Furthermore, when the strategy 802 fails, an intelligence system for attaining the upper goal 801 by partitioning, integrating, and cooperating different goals by the strategy 803 can be realized. By doing this, a system having intelligence for making a judgment on the main issue by issuing only a lower request and inferring an upper request can be realized.

Next, goal attaining knowledge for controlling a goal which is generated by the goal generator 125 will be explained.

Figure 9:
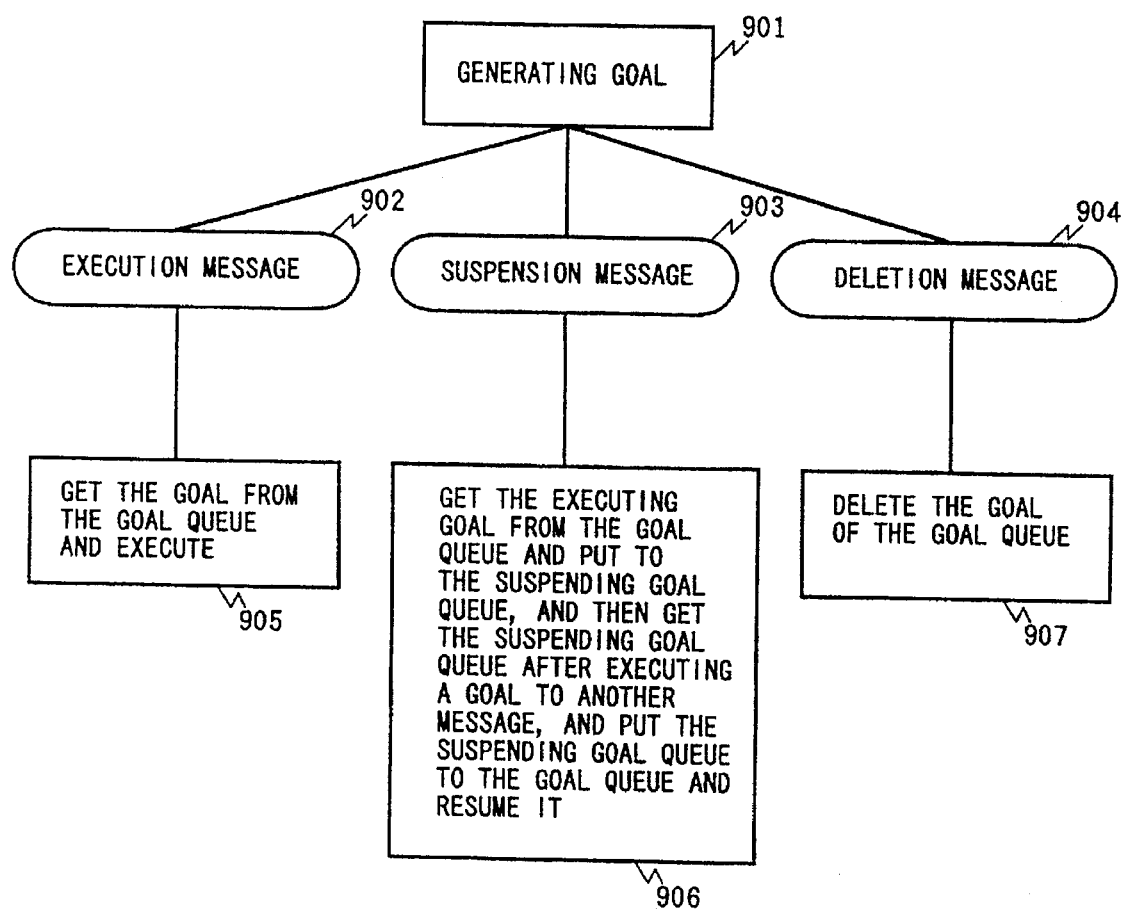
FIG. 9 shows an example (No. 2) of goal attaining knowledge (particularly goal control knowledge).

FIG. 9 shows an example of goal attaining knowledge in the goal attaining knowledge storage 131 for controlling a goal which is generated by the goal generator 125. The system displays a generated goal 901 on the display 144 and executes, suspends, or deletes the goal when an operator sends messages to the computer by the keyboard 142 or the mouse 143 shown in FIG. 1. These control messages can be sent from not only an operator but also another system or computer, or another program, or the inference unit or the goal attainment program itself.

For example, when an execution message 902 is received, the system gets the goal from the goal queue (generated goal storage) 122 and executes it (905). If a suspension message 903 is issued when necessary to process a message, which is received later, during execution of the goal, the system deletes or suspends the executing goal in the goal queue 122, moves it to the suspending goal queue 123 in the memory, and suspends the executing goal (906). Next, the system generates a goal for the message stored in the message queue 121, attains the goal, and puts the goal which is suspended in the goal queue 122 into the execution state or puts it to the goal queue 122 again, and resumes it (906). When a deletion message 904 is issued during execution of the goal, the generated goal can be deleted from the goal queue 121 (907).

[EMBODIMENT 3]

Next, the third embodiment of the present invention will be explained. This embodiment is an embodiment that knowledge is represented by a data block (a case of a frame will be described integratedly hereunder) having a class attribute which can succeed to the frame or type, that is, the upper structure on the basis of the entire structure shown in FIG. 1.

FIGS. 10(a) through 10(e) show an example of the goal generating knowledge in this embodiment. In this embodiment, the data of the goal generating knowledge storage 131 in the knowledge/data storage 130 shown in FIG. 1, that is, the goal generating knowledge is represented by a frame.

FIG. 10(a) shows a frame indicating a goal generation strategy. A class 1001 indicates a slot for setting data indicating what a frame or what a type of frame is this frame. For this frame, goal generation strategy is mentioned. A message 1002 indicates a slot where the content of the received message is set. A current goal 1003 indicates a goal which is generated by this goal generation strategy. A condition 1004 indicates a condition for generating a current goal in the same way as the condition shown in FIGS. 3 or 4. An upper goal 1005 indicates an upper goal of a current goal. A strategy name 1006 indicates the name of this strategy.

FIG. 10(b) shows a frame indicating a personified unit. The personified unit (reference numerals 124 and 133 shown in FIG. 1) is a package of data for storing various attributes (variables) and procedures which are necessary to attain, evaluate, and integrate goals such as state changes, goals and strategies being attained, attained results, and upper goals and of programs sharing those data. As to the variables representing the attributes, only the program in the package can share, refer to, and change the values thereof. The personified data/procedure kernel package 124 is a personified unit which is used by the inference unit 120.

The personified unit is equivalent to a so-called specialist. For example, to attain a certain goal, the goal is divided into several goals and each goal is processed by each personified unit. By doing this, processing that a complicated problem is solved by a plurality of specialists in cooperation with each other can be realized or modeled.

In the frame indicating the personified unit shown in FIG. 10(b), a class 1011 indicates that the frame is a personified unit. An object 1012 indicates a slot for setting an object to be processed. A belonging 1013 indicates a slot for setting a belonging of an object to be processed. A delay 1014 indicates a slot for setting a delay of a train which is an object to be processed. An upper goal 1015 indicates an upper goal of the goal which is being attained by the current personified unit. A name 1016 indicates the name of the current personified unit.

FIG. 10(c) shows a frame indicating a message. A class 1021 indicates that this frame indicates a message. id 1022 indicates a slot for setting id (identifier) of a message. A sender 1023 indicates a sender of a message and a destination 1024 indicates a destination of a message. A content 1025 indicates a content of a message. A delayed train 1026 indicates a train which is delayed and a delayed time 1027 indicates a delayed time (a delay of 20 minutes in this example) of a delayed train.

FIG. 10(d) shows a frame indicating a condition. A class 1031 indicates that this frame indicates a condition. id1032 indicates id (identifier) of a condition. A content 1033 indicates the content of this condition. In this example, it indicates the content of the condition that the value of the delay slot is moderate. FIG. 10(e) shows a frame which indicates a condition which is the same as that shown in FIG. 10(d). The meanings of a class 1041, id 1042, and a content 1043 are the same as those of the class 1031, the id 1031, and the content 1033 shown in FIG. 10(d).

In this embodiment having such frames, a time variant goal corresponding to a received message is generated as shown below.

Firstly, it is assumed in this system that a message M (a message in which attached information is added as a parameter may be used) is received by the message receiving unit 127. In this case, the goal generator 125 generates a goal using data stored in the goal generating knowledge storage 131, that is, the goal generating knowledge as shown in FIGS. 2 to 4 which is described in the first embodiment. This embodiment will be explained using the example of goal generating knowledge shown in FIG. 4(a) which generates a goal for a message and a plurality of conditions.

As an actual example, a case that a through train on a line of another company is delayed before entering the line of another company and an attempt is made to avoid the delay of the through train on the line of another company before it enters the line of another company will be considered.

Firstly, on receipt of a message M of "there is a delayed train" including delay data, the system sets the class 1021, the id 1022, the sender 1023, the destination 1024, the content 1025, the delayed train 1026, and the delayed time 1027 as shown in FIG. 10(c) according to the message with reference to the delay data so as to prepare a message frame.

Next, with reference to this message, the system sets slot values such as the object 1012, the belonging 1013, and the delay 1014 in the personified unit frame shown in FIG. 10(b).

Next, the system sets the value of the content slot 1025 of the message M in the message slot 1002 of the frame shown in FIG. 10(a) in which the class is the goal generation strategy 1001. In this case, as to the condition 1004, when there are a frame (FIG. 10(d)) that the class is "condition" 1031, the id is "condition K" 1032, and the content is "{delay, moderate}" 1033 and a frame (FIG. 10(e)) that the class is "condition" 1041, the id is "condition L" 1042, and the content is "{belonging, line-W}" 1043, and the value of the upper goal slot 1005 matches with the value of the upper goal 1015 of the personified unit frame (FIG. 10(b)) which is in execution or on the scene at present, and the values of the delay slot and belonging slot of the personified unit frame match with "moderate" and "line-W" which are values specified for the contents of the above conditions K and L respectively, the goal S of the current goal slot 1003 can be generated.

When the message slot 1002, the upper goal slot 1005, and the condition slot 1004 of the goal generation strategy frame (FIG. 10(a)) are not specified, by making them optional by default, the value of the current goal slot 1003 of this frame can be generated as a goal. Without setting a part of them, for example, only the value of the upper goal slot 1005, a goal can be generated regardless of the upper goal.

Furthermore, when a strategy frame for goal attainment control having a deletion goal slot, pause (break) goal slot, attainment suspension goal slot, and resume goal slot is prepared instead of the generation goal slot, by expressing knowledge for goal control in the same way as with the goal generation strategy frame, the inference unit 120 can use them so as to control generation, deletion, and attainment of a goal. Needless to say, a normal data block may be used instead of the frame.

Furthermore, a plurality of goals to be generated or deleted may be specified. To generate goals, the original goal frame is copied and actual values are set to the slots of the copied frame. Needless to say, actual values may be set to the slots of the original frame. In the latter case, although the memory can be saved, a plurality of goals of the same class cannot be generated. As mentioned in the second embodiment, even when the goal is not a frame but a simple data block, it may be copied or may not be copied in the same way as with the frame.

Figure 11:
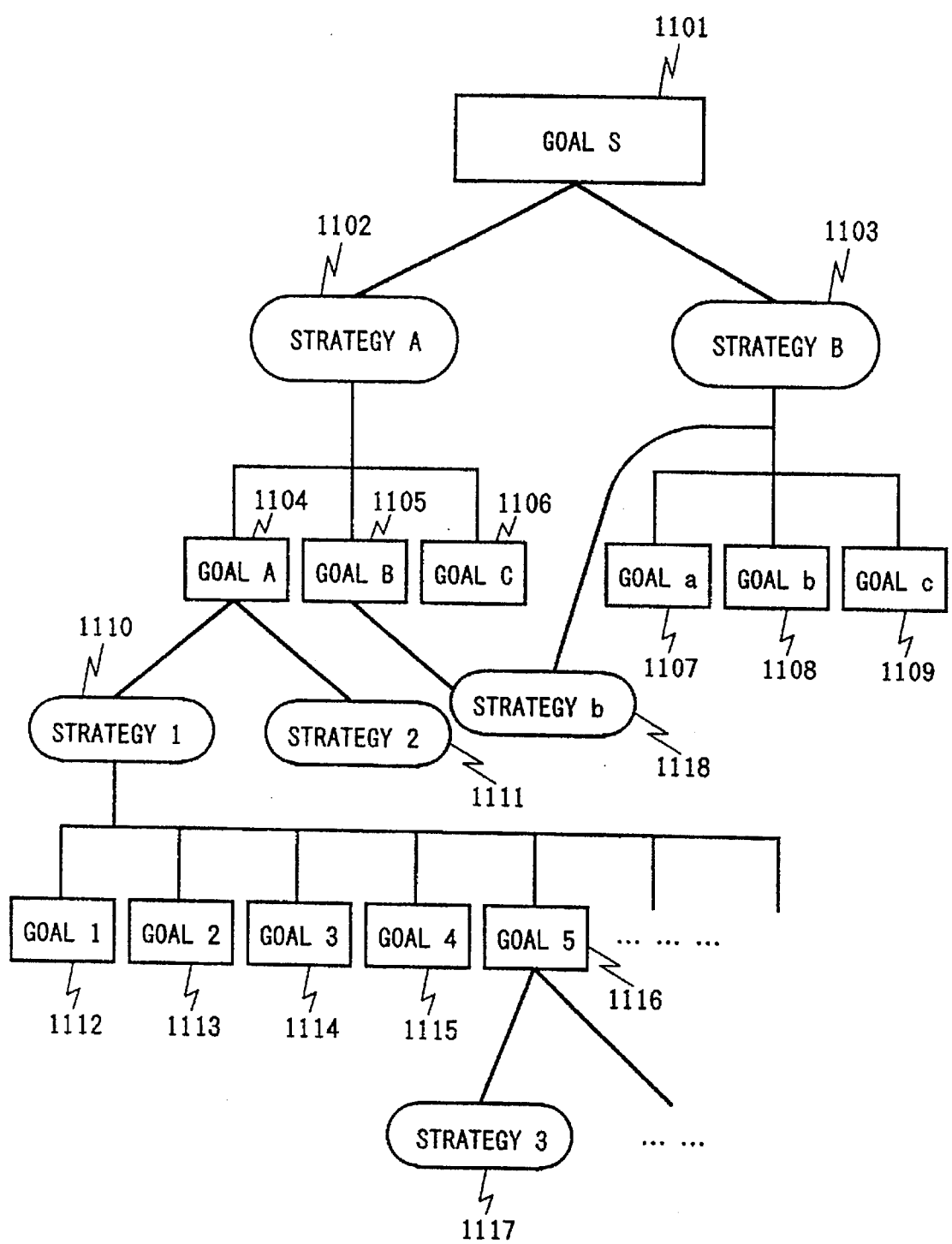
FIG. 11 shows an example of a goal strategy net.

FIG. 11 shows the goal strategy net which is used in this embodiment, that is, a recursive hierarchical network of a goal and a partition and attainment strategy for sub-goals thereof.

In FIG. 11, the connection to a strategy A (1102) or a strategy B (1103) from a goal S (1101) which is generated as explained in FIG. 10 is OR. It indicates that one of the strategies A and B is selected for the goal S.

Next, the connection to a goal A (1104), a goal B (1105), etc. from the strategy A (1102) is AND. It indicates that, for example, it is necessary to process the goals in the order of the goal A (1104), goal B (1105), and goal C (1106) to the right starting from the goal A. To attain all the goals which are connected by AND, needless to say, the parallel processing or the execution order may be selected freely (no special order). They can be specified by the strategy (strategy A in this case), for example, an execution order slot 1624 (FIG. 16).

By doing this, the goal strategy net can hierarchize knowledge systematically by the goal and the strategies of generation, deletion, attainment control, partition, attainment, and integration thereof. Furthermore, the strategies of generation, deletion, and attainment control of a goal which are described in the example shown in FIG. 9 can be incorporated into the goal strategy net. For example, it can be set that the strategy A (1102) shown in FIG. 11 is a strategy for generating the goal A, goal B, etc. and a strategy 3 (1117) is a strategy for deleting the goal C (1106), or a goal 5 (1116) is an attainment and suspension strategy for suspending execution of a postattainment goal B (1105).

By using the goal strategy net like this, a knowledge engineer or end user can analyze and regulate the know-how and incorporate it into the computer easily. The knowledge and programs can be changed or added with new ones easily.

Next, the storage status of a generated time variant goal or partitioned and generated sub-goals will be explained.

Figure 12:
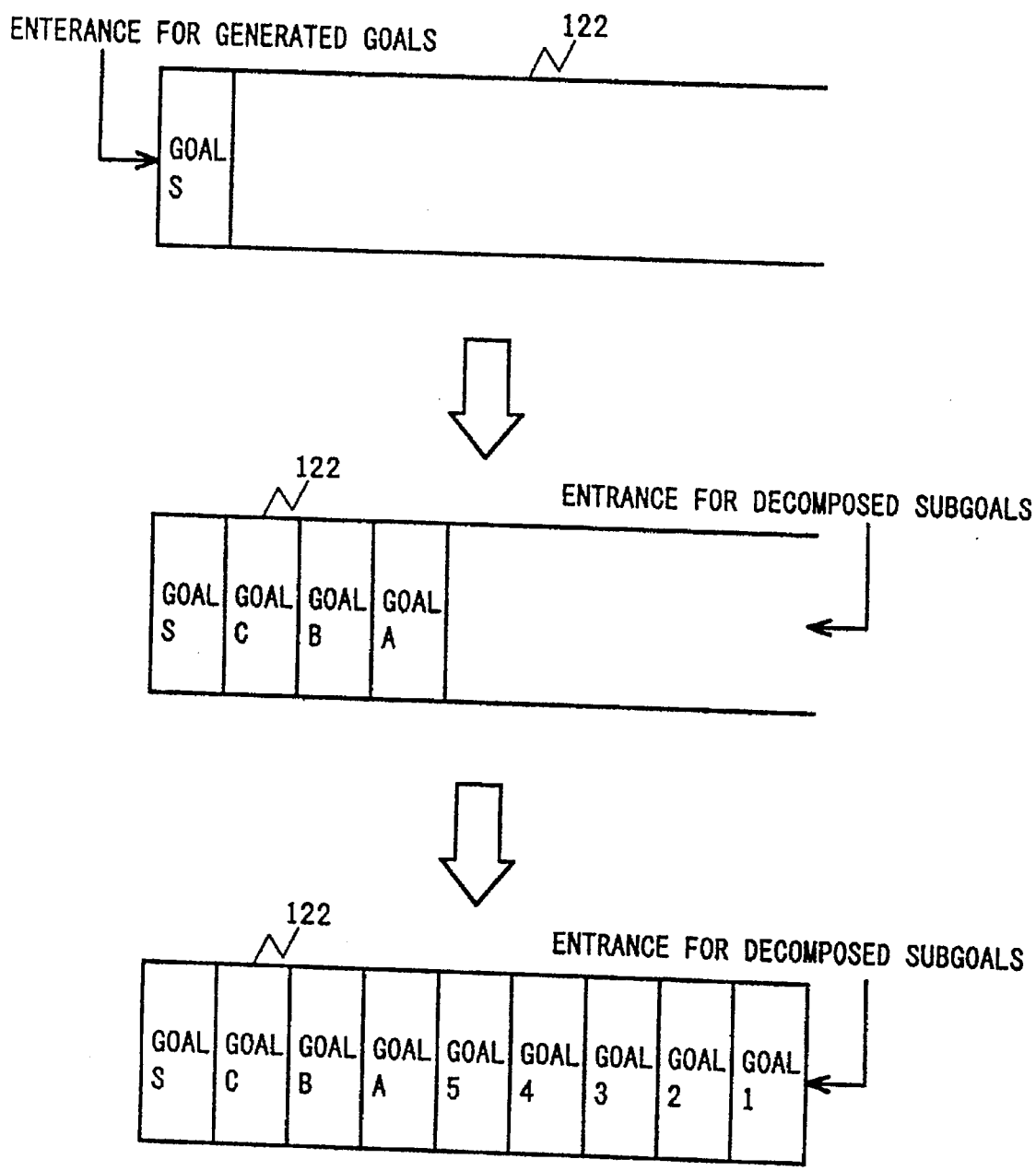
FIG. 12 shows drawings of a goal input method into a goal generating queue.
Figure 13:
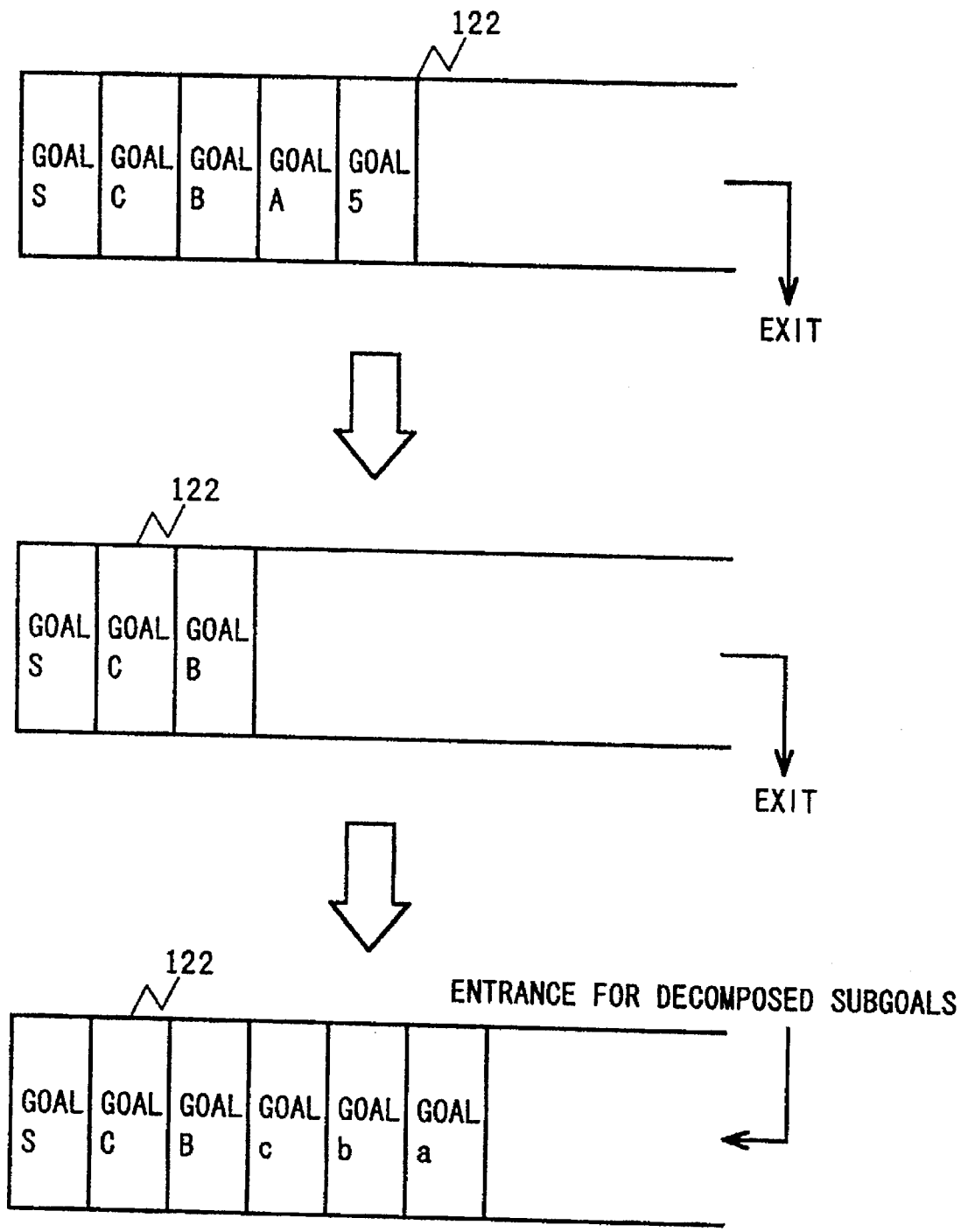
FIG. 13 shows drawings of a goal processing method in a goal generating queue.

FIGS. 12 and 13 show the storage statuses of the generated goal storage (goal queue) 122 where time variant goals which are generated using the goal generating knowledge of the goal generating knowledge storage 131 and sub-goals which are partitioned and generated by the goal strategy net shown in FIG. 11 are temporarily stored.

The generated goal storage 122 stores the time variant goals as a queue (first-in first-out) and the sub-goals as a stack (last-in first-out) respectively. Namely, the left of the generated goal storage 122 shown in FIG. 12 is an entrance as a queue, that is, an entrance for storing time variant goals which are dynamically generated from received messages. The right of the generated goal storage 122 shown in FIG. 12 is an entrance as a stack, that is, an entrance for storing partitioned and generated sub-goals which are obtained when a goal is partitioned and generated by the goal strategy net.

The upper drawing shown in FIG. 12 shows the status that the time variant goal S (the reference numeral 1101 shown in FIG. 11) is stored as a queue from the left. The middle drawing shows the status that the strategy A (1102) for partitioning a goal shown in FIG. 11 is selected and the partitioned sub-goals are stored in the generated goal storage 122. From the left of the generated goal storage 122, the goal C (1106), goal B (1105), and goal A (1104) are stored as a stack in this order.

The lower drawing shows the status that the sub-goals which are obtained by applying the strategy 1 (1110) for partitioning the goal A (1102) are stored as a stack also from the left of the generated goal storage 122 in the order of the goal 5 (1116), goal 4 (1115), etc.

When all the sub-goals which are partitioned and generated using the goal strategy net are pushed to the generated goal storage 122 like this, from the top of the stack, that is, from the right of the generated goal storage 122, the goals are gotten in the order of the goal 1 (1112), goal 2 (1113), etc. and attained and integrated as shown in FIG. 13. The gotten and processed goals are erased from the generated goal storage 122.

When the processing up to the goal 5 (1116) ends, as shown in the middle drawing in FIG. 13, the goal A (1104) is gotten. When it is evaluated as attained, it is erased from the generated goal storage 122.

Next, the strategy b (1118) for the goal B (1105) is selected, and the goal a (1107), goal b (1108), and goal c (1109) which are sub-goals thereof are pushed as shown in the lower drawing in FIG. 13, and the aforementioned processing is repeated, and the goals are partitioned, attained, and integrated according to the goal strategy net (goal cooperation inference processing). For the goal attribute which is necessary for back track and other goal attainment and control, the attribute of the goal frame (data block) or goal joint frame (data block) is referred to. For example, a goal whose level slot value is 3 or more is not selected as an object of back track and skipped. It is desirable to use the partitioning and attaining method indicated in Japanese Patent Application Laid-Open No. 2-14323.

Figure 14:
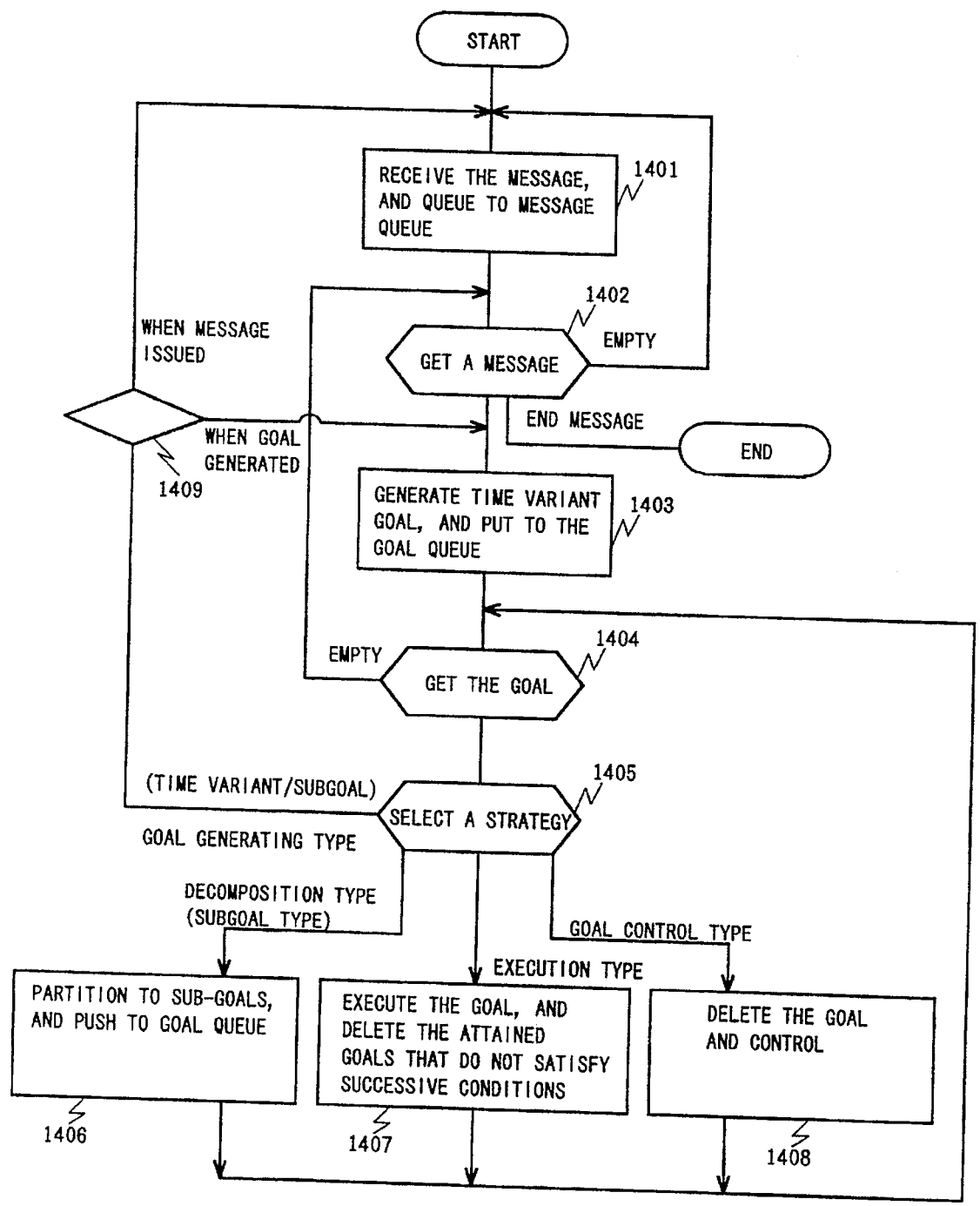
FIG. 14 is a flow chart (No. 2) of time variant goal knowledge processing.

FIG. 14 is a flow chart showing the processing procedure for generating and attaining a goal by the system of this embodiment.

The system of this embodiment puts a received message (for example, information which varies with time such as train delay information) to the message queue 121 first in a block 1401. Next, the system gets a message from the message queue 121 in a block 1402. When there is no message to be gotten, the system returns to the block 1401. When the gotten message is an end message, the system ends the processing.

When the system gets the message in the block 1402, it generates a goal corresponding to the message using goal generating knowledge as shown in FIG. 10 or FIGS. 2 to 4 in a block 1403 and queues it to the generated goal storage (goal queue) 122. When the goal is generated, the system attains it using the goal strategy net explained in FIG. 11. Firstly, the system gets the goal from the goal queue 122 in a block 1404 (not deleted from the queue). When the goal queue 122 is empty, the system returns to the block 1402 and gets the next message.

When the system gets the goal in the block 1404, it selects a one among a plurality of strategies corresponding to the goal which is suited to the state in a block 1405.

Firstly, when the strategy type (specified by the type slot value shown in FIG. 16 which will be described later or specified as a class slot value as shown in FIG. 10) is the time variant goal generating type, the system goes to the block 1403 from the block 1405 via a block 1409, generates the specified time variant goal in the generation goal slot thereof, and queues it to the goal queue 122. When the value of the generation goal slot is empty, the system starts the means (rule group or function) specified by the generating means slot and lets the means issue a message. The system goes to the block 1401 from the block 1405 via the block 1409 and continues the processing.

The time variant goal generating type strategy is a strategy for generating a time variant goal and the frame thereof is provided with a generation goal slot 1618 for indicating a time variant goal to be generated which is shown in FIG. 16 and a generation means slot 1619 for indicating a means to be started when the value of the generation goal slot is empty.

When the strategy selected in the block 1405 is a sub-goal generating type strategy (strategy for generating sub-goals), the system sets a sub-goal generation mode, goes to the block 1403 from the block 1405 via the block 1409, and pushes the generated sub-goals to the goal queue 122. The other processing is the same as that of the time variant goal.

When the strategy selected in the block 1405 is a decomposition type strategy (strategy for partitioning the goal), the system partitions the goal to sub-goals in a block 1406 and pushes the generated sub-goals to the goal queue 122. Then, the system returns to the block 1404 again, gets the goal from the goal queue 122, and repeats the strategy selection operation in the block 1405.

When the strategy selected in the block 1405 is an execution type strategy (strategy for executing the procedure and rules for attaining the goal), the system executes the goal in a block 1407. When the system confirms the attainment of the goal as a result, it deletes the attained goals from the goal queue 122 and then returns to the block 1404.

There are strategies for which a continuation condition is specified like the strategies shown in FIGS. 16 and 17 which will be described later. The continuation condition is specified, for example, by the processing repetition number. In the block 1407, the system checks this continuation condition. While the continuation condition is being satisfied, the system attains the strategy repeatedly. When the continuation condition is not satisfied, the system deletes the goal.

When the strategy selected in the block 1405 is a goal control type strategy (deletion, pause, suspension, resumption, priority execution, attainment and suspension, etc.), the system controls the goal in a block 1408.

Namely, when the strategy selected in the block 1405 is a goal deletion type strategy (for example, the value of the class slot shown in FIG. 10(a) is a goal deletion strategy) among the goal control type strategies, the system deletes the goal which is specified in the current goal slot of the goal deletion type strategy frame thereof from the goal queue 122 in the block 1408, returns to the block 1404, and gets the next goal from the goal queue 122.

When the strategy selected in the block 1405 is a goal suspension type strategy, the system suspends the goal execution status (1609 shown FIG. 16 which will be described later) which is specified in the current goal slot of the goal suspension type strategy frame thereof in the block 1408 and returns to the block 1404. When the goal gotten in the block 1404 is a suspension status, the system suspends execution of the goal and goals which are similar to or lower than the goal in level (the value of the level slot 1603 shown in FIG. 16 which will be described later) and executes the next goal. Needless to say, a method for suspending execution of all other goals or suspending execution of only goals to which suspension is specified may be used.

As mentioned in the first embodiment (FIG. 8), it is possible to delete a goal to be suspended from the goal queue 122, put it to the suspending goal queue 123, and move it from the suspending goal queue 123 to the goal queue 122 and execute it when a resume type strategy is to be executed or a resume request message is received.

When the strategy selected in the block 1405 is a pause type strategy, the system pauses the execution of the goal and sub-goals thereof which are specified in the current goal slot of the pause type strategy frame thereof in the block 1408, deletes all the goals from the goal queue 122 or sets the value of the execution status slot thereof (1609 shown in FIG. 16 which will be described later) to pause without deleting it, and returns to the block 1404.

When the strategy selected in the block 1405 is a priority execution type strategy (the value of the class slot 1001 shown in FIG. 10(a) is priority execution strategy), the system pushes the goal which is specified in the current goal slot of the priority execution type strategy frame thereof to the top the goal queue and executes it first. Although the execution of the original goal is suspended, it will be resumed when the execution of the priority goal ends.

When the strategy selected in the block 1405 is a resume type strategy, the system changes the value of the execution status slot (1609 shown in FIG. 16 which will be described later) from suspension or pause to execution so that the goal and sub-goals thereof which are specified in the current goal slot of the resume type strategy frame thereof can be executed.

When the execution of all the sub-goals ends, the upper goal is gotten in the block 1404. When the attainment thereof is confirmed, the system, deletes it from the goal queue 122 and gets and processes the next goal. When the attainment of the upper goal is not confirmed (the evaluation is other than OK), the system adjusts or selects another strategy. When the goal cannot be attained even if another strategy is selected, the system may return to the previous goal or the upper goal (back track). For that purpose, it is desirable to save the attained goals and strategies, for example, in the suspending goal queue 123 or a copy thereof and to return it to the goal queue again when the system returns.

When the goal queue 122 is empty in the block 1404, the system returns to the block 1402 and gets the next goal. When there is no message, the system returns to the block 1401. When there is no received message in the block 1401, the system may return control to the operating system 101 and wait for a message. When the message gotten in the block 1402 is a system end message, the system ends the processing.

To improve the critical response, when a message is received, it is possible to pause the attainment of goal, to generate a goal immediately and push it to the goal queue 122, and then to resume the paused goal. When the received message is a goal execution request message, it is possible to push the goal for which execution is requested to the top of the goal queue 122 and execute it and to resume the paused goal when the attainment is completed.

When the value of the clone number (number of children) (clone number slot 1605 or 1615 shown in FIG. 16 which will be described later or 1706 shown in FIG. 17) of a goal gotten in the block 1404 or a strategy selected in the block 1405 is positive, the system copies the content of the own process, generates different processes (called clones) of the same content by the specified clone number, lets the clones attain an alternative strategy, and selects strategies of which the result is OK or the highest priority alternative schedule.

[EMBODIMENT 4]

Next, the fourth embodiment of the present invention will be described.

FIGS. 15 to 18 show actual embodiments which use the present invention for recovery of irregularity of a train schedule, that is, for train traffic regulation. In the system of this embodiment which performs train traffic regulation, a problem such as a train delay is displayed with an asterisk on a train schedule diagram on the display. When a user picks the asterisk, a message in which the problem at the picked position, for example, a delay of the last train is symbolized is inputted into the system.

The system of this embodiment has the structure shown in FIG. 1 in the same way as with the third embodiment mentioned above. The processing procedure is the same as that shown in FIG. 14. In the system of this embodiment, when a user picks an asterisk on a train schedule diagram on the display and inputs a message into the system as mentioned above, a time variant goal corresponding to the message is generated.

Figures 15A, 15B:
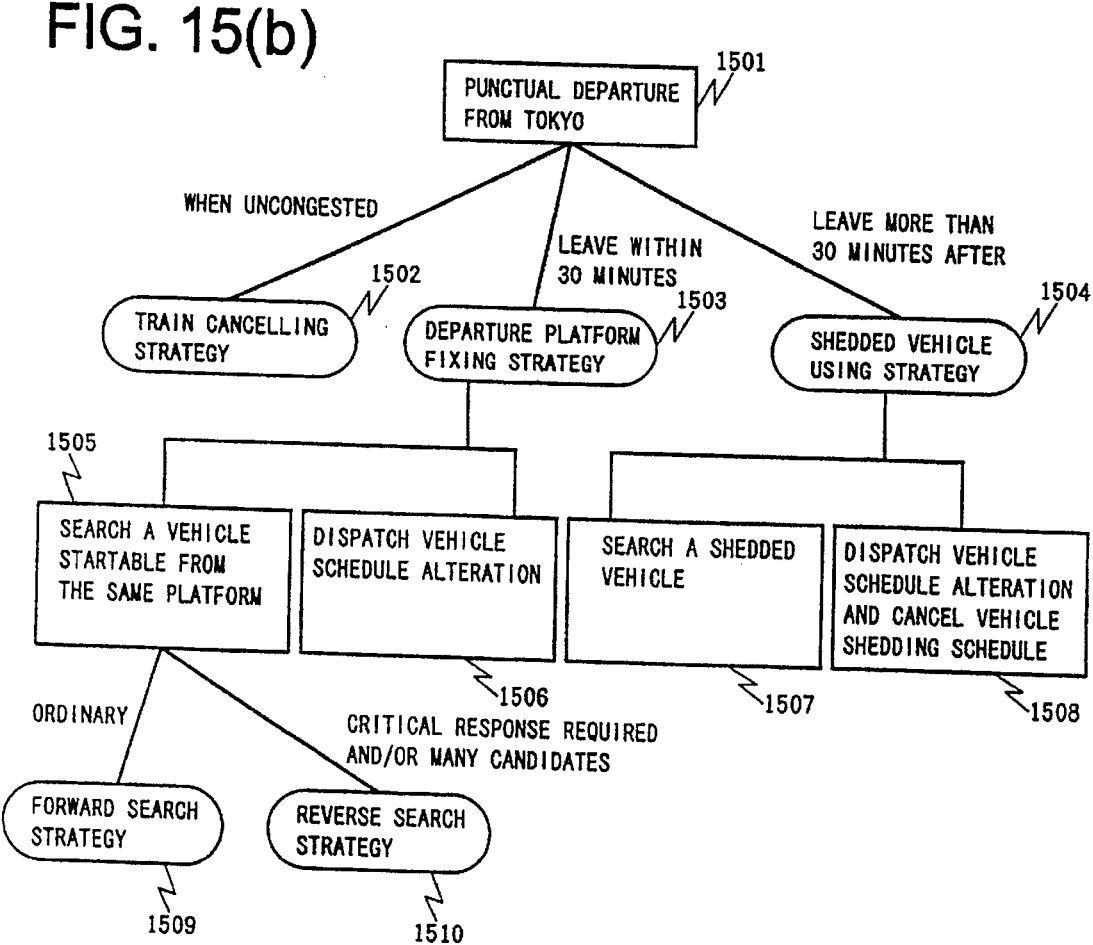
FIGS. 15(a) and 15(b) show an example of goal generating knowledge and an example of a goal strategy net.

FIG. 15(a) shows goal generating knowledge to be used in this embodiment. A problem to be inputted as a message and a goal to be generated in correspondence with the problem are recorded. In this embodiment, when the picked problem does not match with any of the conditions shown in the table in FIG. 15(a), a goal corresponding to the last condition "default" is generated.

The embodiment will be explained hereunder on the assumption that a goal of "punctual departure from Tokyo station" corresponding to "default" is generated. By setting the condition item in this table, when the same asterisk is picked, that is, for the same message, instead of the goal of "punctual departure from Tokyo station", a sub-goal of dispatch vehicle schedule alteration thereof or a quite different goal can be materialized or generated.

FIG. 15(b) shows an actual example of goal attaining knowledge to be used in this embodiment. This is the goal strategy net which is explained in the third embodiment mentioned above.

In the goal strategy net shown in FIG. 15(b), it is assumed that the goal and strategy are represented in the frame (data block). To attain a goal, a strategy which can be applied to the goal is selected first. For example, to attain a goal 1501 of "punctual departure from Tokyo station", a strategy which is suited to the state is selected from a plurality of strategies such as a "train canceling strategy" 1502, a "departure platform fixing strategy" 1503, and a "shedded vehicle using strategy" 1504 corresponding to the goal 1501.

It is assumed that the "departure platform fixing strategy" 1503 is selected. This indicates that to allow the current train to depart punctually from Tokyo station, a strategy for fixing the departure platform is used. The "departure platform fixing strategy" 1503 is a decomposition type strategy and a sub-goal of "search a vehicle startable from the same platform" 1505 and a sub-goal of "dispatch vehicle schedule alteration" 1506 are generated. Furthermore, the operation for selecting a strategy for sub-goals is repeated.

When the sub-goal of "dispatch vehicle schedule alteration" 1506 is an execution type goal, the system executes the goal according to the specified procedure and rules. When the execution ends, the system gets the goal from the goal queue 122. When the goal queue 122 becomes empty, the system enters the message reception waiting state, returns control to the operating system, and waits for the next message.

FIG. 16(a) shows a representation example using the frame (data block) of the goal of "punctual departure from Tokyo station" 1501 which is generated as mentioned above. The problem type, problem station, and problem train which are displayed with asterisks are represented by the current problem, current station, and current train slots sequentially.

The frame indicating a goal has slots of the following contents.

Class: Goal (1601)
Name: Punctual departure from Tokyo station (1602)
Level: 1 (1603)
Type: Clone (1604)
Clone number (number of children): 3 (1605)
Applicable strategy: {Departure platform fixing strategy, shedded vehicle using strategy, train canceling strategy} (1606)
Current problem: Shortage of time for changing direction (1607)
Current station: Tokyo (1608)
Execution status: Suspending (1609)
Current train: 2040A (1610)

FIG. 16(b) shows a representation example of a strategy frame for the "departure platform fixing strategy" specified at the applicable strategy slot (1606) in the frame (data block) shown in FIG. 16(a). This strategy frame has slots of the following contents.

Class: Strategy (1611)
Name: Departure platform fixing strategy (1612)
Applicable goal: Punctual departure from Tokyo station (1613)
Applicable situation: Less than 30 minutes before departure (1614)
Clone number (number of children): 2 (1615)
Sub-goal: {search a vehicle not yet leaving from the same platform, dispatch alteration} (1616)
Type: Decomposition type (1617)
Generation goal: {} (1618)
Generation means: Goal generating means K (1619)
Alternative means: {Alternative procedure 1, alternative procedure 2} (1620)
Adjustment means: {Main adjustment procedure, alternative adjustment procedure 1, alternative adjustment procedure 2} (1621)
Continuation condition: {Repetition number, 7} (1622)
Priority: 70 (1623)

In this case, one of the applicable strategy of goal and the applicable goal of strategy may not exist. The reason is that a goal to which the strategy can be applied can be searched. Needless to say, a strategy for goal control such as the goal generation strategy does not always require both of them. When a strategy has both of them, if the applicable strategy of goal is executed first, the processing efficiency is generally good. By compiling the strategy before inference and linking the applicable goal to the strategy, even when only the applicable goal of strategy or both the strategy and goal are used, the applicable strategy can be gotten efficiently.

The goal frame and strategy frame shown in FIGS. 16(a) and 16(b) may be combined as a goal and strategy joint strategy. FIG. 17 shows a representation example of a goal and strategy joint strategy frame. This goal and strategy joint strategy frame has slots of the following contents.

Class: Strategy (1701)
Name: Departure platform fixing strategy (1702)
Goal name: Punctual departure from Tokyo station (1703)
Applicable goal: Punctual departure from Tokyo station (1704)
Applicable situation: Less than 30 minutes before departure (1705)

Clone number (number of children): 2 (1706)

Sub-goal: {search a vehicle not yet leaving from the same platform, dispatch alteration} (1707)

Type: Decomposition type (1708)

Generation goal: { } (1709)

Generation means: Goal generating means K (1710)

Alternative means: {Alternative procedure 1, alternative procedure 2} (1711)

Adjustment means: {Main adjustment procedure, alternative adjustment procedure 1, alternative adjustment procedure 2} (1712)

Continuation condition: {Repetition number, 7} (1713)

Priority: 70 (1714)

It is desirable to handle and process such a goal and strategy joint strategy in which a goal and strategy are unified as a goal in the flow shown in FIG. 14. For example, when a goal is to be generated for a message, a goal and strategy joint strategy is generated. When there are a plurality of same strategies as a goal name for this goal and strategy joint strategy, it is desirable to use the representative strategy (the representative strategy is necessary to be a strategy having a highest priority attribute; to improve the processing efficiency, a goal and strategy joint strategy which is found first may be used as a representative strategy; only the goal name may be pushed and processed to the queue so as to obtain best efficiency) together as a goal. Another strategy is searched and selected when the goal is attained.

FIG. 18 shows an example of a frame indicating a personified unit. The personified unit frame includes slots of a class 1801 and a name 1802 as well as slots 1803 to 1813 for storing various attributes (variables) necessary to attain, evaluate, and integrate a goal. The frame also includes programs such as a procedure A 1814 and a procedure B 1815.

According to the present invention, by generating and executing a plurality of goals dynamically in correspondence with a situation which changes with time, problems can be solved dynamically. Cooperation control for partition, integration, and suspension of a goal can be applied. By doing this, advanced intelligence can be realized for a system for correcting a schedule in real time. A goal attainment method, a method for partitioning a goal to sub-goals, and a method for generating an accompanying goal can be selected easily. Particularly, knowledge for solving a difficult problem which changes with time can be constructed, understood, changed, and added easily by the goal strategy net which is expanded so as to include goal generation and goal control. Furthermore, for the same message, various goals can be generated and the generated goals can be changed and selected easily. Various strategies for solving a goal can be selected flexibly. These selection and changing methods can be learned easily. By doing this, a difficult problem which changes with time can be solved practically.

What is claimed is:

1. A dynamic information processing system including a processor, storage means and input means, comprising:

goal generating knowledge represented by means of a data block indicating relation between a goal and at least one of an inputted message and a situational condition, said goal being also represented by means of a data block indicating at least one of a summarized problem to be solved and a state to be reached, and the data block representing a goal generating knowledge is stored in said storage means;

goal attaining knowledge represented by means of a data block indicating a method for attaining the generated goal, and the data block representing a goal attaining knowledge is also stored in said storage means;

goal generating means for generating a goal, based upon the inputted message by use of said goal generating knowledge; and a goal attaining means for attaining the generated goal by use of said goal attaining knowledge.

2. A dynamic information processing system according to claim 1, wherein said goal attaining knowledge is represented by means of structured data forming a hierarchical network, with at least one level of hierarchy, having, as its nodes, a data block representing a goal and a data block representing a strategy for attaining the generated goal through repetitively decomposing a goal into subgoals, attaining the subgoals, and coordinating them.

3. A dynamic information processing system according to claim 1, wherein said goal generating means uses the data for materializing the goal which is possessed by said inputted message as a parameter.

4. A dynamic information processing system according to claim 1, wherein said goal attaining means can generate and attain a goal by at least one of issuing a message on the basis of the execution including the halfway result of the execution and of specifying to generate a goal directly in said execution.

5. A dynamic information processing system according to claim 1, wherein said system has a package of personified units comprising data and a program for referring to and changing said data and generates and attains a goal using said personified units.

6. A dynamic information processing system according to claim 1, wherein if said goal generating knowledge satisfies at least one condition group (one condition or a set of a plurality of conditions which are logically connected by AND or OR) when it receives at least one message, said goal generating knowledge has knowledge for making these message, condition group, and goal correspond to each other so as to generate at least one goal.

7. A dynamic information processing system according to claim 1, wherein if said goal generating knowledge has at least one upper goal already and satisfies at least one condition group when it receives at least one message, said goal generating knowledge has knowledge for making these message, goal, condition, and generated goal correspond to each other so as to generate at least one new sub-goal.

8. A dynamic information processing system according to claim 1, wherein said goal generating knowledge has knowledge for making at least one of a combination of a plurality of messages and a combination of the combination and a plurality of conditions correspond as a background, situation, state, or motive and for making a goal correspond to at least one of them and composed one thereof.

9. A dynamic information processing system according to claim 1, wherein when a plurality of goals are generated, said goal generating means specifies priority to said generated goals and generates goals for messages on said priority basis.

10. A dynamic information processing system according to claim 1, wherein said dynamic information processing system can execute directly the strategy for the inputted message.

11. A dynamic information processing system according to claim 1, wherein said goal attaining knowledge has knowledge for starting the strategy directly by inputting a message and controlling a goal, including generation, execution, deletion, and resumption of a goal.

12. A dynamic information processing system according to claim 1, wherein when said dynamic information processing system receives a message, it generates a goal relating to said message, displays it on the display when it is specified by a user, controls at least one of execution, deletion, and resumption of the goal, attains said generated goal using said goal attaining knowledge, and outputs the problem solution result to the output device including the display.

13. A dynamic information processing system according to claim 1, wherein said dynamic information processing system is a system for correcting a traffic schedule of a moving article including a train in real time, receives information relating to traffic irregularity caused by a delay as a delay message, generates and attains a goal on the basis of it, and outputs said procedure to be attained as a proposed amendment of the traffic schedule.

14. A dynamic information processing system according to claim 1, wherein said system describes an applicable strategy name for a goal as a slot value indicating an attribute of the goal and hence gets the applicable strategy efficiently.

15. A dynamic information processing system according to claim 1, wherein said system sets a slot indicating an attribute which indicates necessity or unnecessity of returning as a goal and can backtrack (return) by skipping the goal of unnecessity of returning.

16. A dynamic information processing system including a processor, storage means and input means, comprising:

goal generating knowledge which is a strategy represented by a data block having a data item indicating a goal to be generated and having a data item indicating at least one of an inputted message and a situational condition for generating the goal, said goal being also represented by means of a data block indicating at least one of a summarized problem to be solved and a state to be reached, and the data block representing a goal generating knowledge is stored in said storage means;

goal attaining knowledge represented by means of a data block indicating a method for attaining the generated goal, and the data block representing a goal attaining knowledge is also stored in said storage means;

goal generating means for generating a goal, based upon the inputted message by use of said goal generating knowledge; and a goal attaining means for attaining the generated goal by use of said goal attaining knowledge.

17. A dynamic information processing system according to claim 16, wherein said goal attaining knowledge is represented by means of structured data forming a hierarchical network, with at least one level of hierarchy, having, as its nodes, a data block representing a goal and a data block representing a strategy for attaining the generated goal through repetitively decomposing a goal into subgoals, attaining the subgoals, and coordinating them, whereby dynamically changing and complex large scale problems can be solved if only constructing a hierarchical network including both strategies for goal generation and for goal attainment.

18. A dynamic information processing system according to claim 7, wherein said strategy includes a strategy for generating a goal from an inputted message, a strategy for hierarchizing a goal recursively to subgoals and integrating them, and a strategy for goal processing resource control including at least one of deleting, pausing, executing, suspending, and resuming a goal, and said goal attaining means further comprising means for at least one of (i) repetitively partitioning a goal to subgoals until they become directly attainable, (ii) attaining, and (iii) integrating and controlling resources for processing or attaining the goals including deletion of at least one of unnecessary and non-urgent goals already generated.

19. A dynamic information processing system according to claim 18, wherein said strategy includes also a goal and strategy joint strategy in which strategies and goals are described together.

20. A dynamic information processing system according to claim 18, wherein said strategy includes a strategy which can specify a continuation condition as an attribute of the strategy and said goal generating means attains the strategy repeatedly while the continuation condition is satisfied.

21. A dynamic information processing system according to claim 18, wherein at least one of said goal and strategy can give an attribute for generating a different process and attaining the goal by a different method to a package of programs having contents which are the same as those of the own process and of common data thereof.

22. A dynamic information processing system according to claim 18, wherein when there are a plurality of strategies having the same goal, said goal and strategy joint strategy can handle one of said strategies also as a goal.

23. A dynamic information processing system according to claim 18, wherein in said goal generation and attainment, by copying a data block indicating one of the corresponding goal and strategy and setting an actual value to said copied one, a goal and strategy of the same type can be materialized, generated, and attained.

24. A dynamic information processing system according to claim 18, wherein when said generated goal is a sub-goal of the goal strategy net, by generating an upper goal of said goal strategy net and selecting an alternative strategy when necessary, the sub-goals including the upper goal can be attained.

25. A dynamic information processing system according to claim 18, wherein when said system cannot attain the goal, it can select another strategy.

26. A dynamic information processing system according to claim 18, wherein when said system cannot attain the goal even if it selects another strategy, it can backtrack (return) to a goal which is already attained or an upper goal.

27. A dynamic information processing system according to claim 18, wherein said system can describe a goal name which can be applied by a strategy as a slot value indicating an attribute of the strategy.

28. A dynamic information processing system according to claim 18, wherein said goal generating means can infer a goal at high speed by compiling it before inferring.

29. A dynamic information processing system according to claim 17, wherein said strategy includes also a goal and strategy joint strategy in which strategies and goals are described together.

30. A dynamic information processing system according to claim 17, wherein at least one of said goal and strategy can give an attribute for generating a different process and attaining the goal by a different method to a package of programs having contents which are the same as those of the own process and of common data thereof.

31. A dynamic information processing system according to claim 17, wherein said goal attaining means can generate and attain a goal by at least one of issuing a message on the basis of the execution result and of specifying to generate a goal directly in said execution.

32. A dynamic information processing system according to claim 17, wherein in said goal generation and attainment, by copying a data block indicating one of the corresponding goal and strategy and setting an actual value to said copied one, a goal and strategy of the same type can be materialized, generated, and attained.

33. A dynamic information processing system according to claim 17, wherein said system has a package of personified units comprising data and a program for referring to and changing said data and generates and attains a goal using said personified units.

34. A dynamic information processing system according to claim 17, wherein if said goal strategy net satisfies at least one condition group (one condition or a set of a plurality of conditions which are logically connected by AND or OR) when it receives at least one message, said goal strategy net has knowledge for making these message, condition group, and goal correspond to each other so as to generate at least one goal.

35. A dynamic information processing system according to claim 17, wherein if said goal strategy net has at least one upper goal already and satisfies at least one condition group when it receives at least one message, said goal generating knowledge has knowledge for making these message, goal, condition, and generated goal correspond to each other so as to generate at least one new sub-goal.

36. A dynamic information processing system according to claim 17, wherein said goal generating knowledge has knowledge for making at least one of a combination of a plurality of messages and a combination of the combination and a plurality of conditions correspond as a background, situation, state, or motive and for making a goal correspond to at least one of them and composed one thereof.

37. A dynamic information processing system according to claim 17, wherein when a plurality of goals are generated, said inference means specifies priority to said generated goals and generates goals for messages on said priority basis.

38. A dynamic information processing system according to claim 17, wherein said system generates a goal corresponding to a received message using goal generating knowledge using a frame, stores the generated goal temporarily in the memory, and gets and processes said goal by said inference means.

39. A dynamic information processing system according to claim 17, wherein said dynamic information processing system can execute directly the strategy for the inputted message.

40. A dynamic information processing system according to claim 17, wherein said goal attaining knowledge has knowledge for starting the strategy directly by inputting a message and controlling a goal, including generation, execution, deletion, and resumption of a goal.

41. A dynamic information processing system according to claim 17, wherein when said dynamic information processing system receives a message, it generates a goal relating to said message, displays it on the display when it is specified by a user, controls at least one of execution, deletion, and resumption of the goal, attains said generated goal using said goal attaining knowledge, and outputs the problem solution result to the output device including the display.

42. A dynamic information processing system according to claim 17, wherein said dynamic information processing system is a system for correcting a traffic schedule of a moving article including a train in real time, receives information relating to traffic irregularity caused by a delay as a delay message, generates and attains a goal on the basis of it, and outputs said procedure to be attained as a proposed amendment of the traffic schedule.

43. A dynamic information processing system according to claim 17, wherein when said system cannot attain the goal, it can select another strategy.

44. A dynamic information processing system according to claim 17, wherein when said system cannot attain the goal even if it selects another strategy, it can backtrack (return) to a goal which is already attained or an upper goal.

45. A dynamic information processing system according to claim 17, wherein said system describes an applicable strategy name for a goal as a slot value indicating an attribute of the goal and hence gets the applicable strategy efficiently.

46. A dynamic information processing system according to claim 17, wherein said system can describe a goal name which can be applied by a strategy as a slot value indicating an attribute of the strategy.

47. A dynamic information processing system according to claim 11, wherein said goal generating means can infer a goal at high speed by compiling it before inferring.

48. A dynamic information processing system according to claim 17, wherein said system sets a slot indicating an attribute which indicates necessity or unnecessity of returning as a goal and can backtrack (return) by skipping the goal of unnecessity of returning.

49. A dynamic information processing method in a system including a processor, storage means and input means, comprising:

a step of storing goal generating knowledge represented by means of a data block indicating relation between a goal and at least one of a message and situational condition, said goal being also represented by means of a data block indicating at least one of a summarized problem to be solved and a state to be reached;

a step of storing goal attaining knowledge represented by means of a data block indicating a method for attaining the generated goal, and the data block representing a goal attaining knowledge is also stored in said storage means;

a step of generating a goal by a goal generating means, based upon the inputted message by use of said goal generating knowledge; and a step of attaining the generated goal by use of said goal attaining knowledge.

50. A dynamic information processing method in a system including a processor, storage means and input means, comprising:

a step of storing goal generating knowledge which is a strategy represented by a data block having a data item indicating a goal to be generated and having a data item indicating at least one of a message and a situational condition for generating the goal, said goal being also represented by means of a data block indicating at least one of a summarized problem to be solved and a state to be reached;

a step of storing goal attaining knowledge represented by means of a data block indicating a method for attaining the generated goal, and the data block representing a goal attaining knowledge is also stored in said storage means;

a step of generating a goal by a goal generating means, based upon the inputted message by use of said goal generating knowledge, and a step of attaining the generated goal by use of said goal attaining knowledge.

* * * * *

UNITED STATES PATENT AND TRADEMARK OFFICE
CERTIFICATE OF CORRECTION

PATENT NO. : 5,657,428
DATED : August 12, 1997
INVENTOR(S) : Setsuo Tsuruta et al.

It is certified that error appears in the above-indentified patent and that said Letters Patent is hereby corrected as shown below:

Claim 18, column 21, line 60, delete "7" and insert therefor --17--.

Claim 47, column 24, line 18, delete "11" and insert therefor --17--.

Signed and Sealed this

Twenty-fifth Day of November, 1997

*Attest:*

BRUCE LEHMAN

*Attesting Officer*   *Commissioner of Patents and Trademarks*